(12) United States Patent
Kim et al.

(10) Patent No.: US 12,133,245 B2
(45) Date of Patent: Oct. 29, 2024

(54) LOW LATENCY TRANSMISSION TECHNIQUES FOR UPLINK POWER SAVING

(71) Applicant: QUALCOMM Incorporated, San Diego, CA (US)

(72) Inventors: Yuchul Kim, San Diego, CA (US); Hwan Joon Kwon, San Diego, CA (US); Krishna Kiran Mukkavilli, San Diego, CA (US); Tingfang Ji, San Diego, CA (US); Jay Kumar Sundararajan, San Diego, CA (US); Peter Pui Lok Ang, San Diego, CA (US); Yeliz Tokgoz, San Diego, CA (US); Huilin Xu, Temecula, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 17/476,219

(22) Filed: Sep. 15, 2021

(65) Prior Publication Data
US 2022/0095313 A1    Mar. 24, 2022

Related U.S. Application Data

(60) Provisional application No. 63/080,444, filed on Sep. 18, 2020.

(51) Int. Cl.
*H04W 72/08* (2009.01)
*H04L 1/18* (2023.01)
(Continued)

(52) U.S. Cl.
CPC ......... *H04W 72/542* (2023.01); *H04L 1/1819* (2013.01); *H04W 72/0446* (2013.01); *H04W 72/23* (2023.01)

(58) Field of Classification Search
CPC ............... H04W 72/542; H04W 72/23; H04W 72/0446; H04L 1/1819
See application file for complete search history.

(56) References Cited

U.S. PATENT DOCUMENTS

2005/0276266 A1* 12/2005 Terry ................... H04L 5/0092
                                                              370/394
2019/0341004 A1* 11/2019 Satpute .................... G09G 5/12
(Continued)

FOREIGN PATENT DOCUMENTS

EP    3493448 A1    6/2019
EP    3528554 A1    8/2019
(Continued)

OTHER PUBLICATIONS

International Search Report and Written Opinion—PCT/US2021/050603—ISA/EPO—Dec. 20, 2021.

*Primary Examiner* — Melvin C Marcelo
(74) *Attorney, Agent, or Firm* — Holland & Hart LLP

(57) ABSTRACT

Methods, systems, and devices for wireless communications are described in which a base station may configure a user equipment (UE) with a low latency mode indication that indicates one or more different retransmission timelines or repetition techniques relative to communications that are not associated with the low latency mode indication. The base station may provide the low latency mode indication in downlink control information (DCI) that may include a resource grant for uplink resources for an uplink communication, such as for a UE transmission of pose information of an extended reality (XR) application. The low latency mode indication may signal that no retransmissions of the uplink communication are to be transmitted, that a different retransmission timeline is enabled for low latency mode communications, that retransmissions may happen based on a (Continued)

particular timeline that is determined according to one or more timers, or any combinations thereof.

30 Claims, 24 Drawing Sheets

(51) Int. Cl.
  *H04L 1/1812* (2023.01)
  *H04W 72/04* (2023.01)
  *H04W 72/0446* (2023.01)
  *H04W 72/23* (2023.01)
  *H04W 72/542* (2023.01)

(56) References Cited

U.S. PATENT DOCUMENTS

2019/0349135 A1* 11/2019 Xu .......................... H04L 1/188
2020/0053730 A1 2/2020 Hosseini et al.
2020/0084727 A1 3/2020 Yerramalli et al.

FOREIGN PATENT DOCUMENTS

EP 3550754 A1 10/2019
WO WO-0027140 A1 5/2000
WO WO-2020072910 A1 4/2020

* cited by examiner

LOW LATENCY TRANSMISSION TECHNIQUES FOR UPLINK POWER SAVING

CROSS REFERENCE

The present Application for Patent claims the benefit of U.S. Provisional Patent Application No. 63/080,444 by KIM et al., entitled "LOW LATENCY TRANSMISSION TECHNIQUES FOR UPLINK POWER SAVING," filed Sep. 18, 2020, assigned to the assignee hereof, and expressly incorporated by reference herein.

FIELD OF TECHNOLOGY

The following relates to wireless communications, including low latency transmission techniques for uplink power saving.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless multiple-access communications system may include one or more base stations or one or more network access nodes, each simultaneously supporting communication for multiple communication devices, which may be otherwise known as user equipment (UE). These communication devices may support various extended reality (XR) applications, such as augmented reality (AR), mixed reality (MR), and virtual reality (VR). In XR applications, these communication devices may generate and send pose information and other control information to avoid visual conflicts, such as misaligning objects between real and virtual environments, and other visual conflicts. In some cases, transmission of the pose information and other control information by these communication devices may be latency sensitive, where increased latency may result in degraded user experience. It therefore may be desirable to manage communications related to XR applications, among other examples, to provide for reduced latency.

SUMMARY

The described techniques relate to improved methods, systems, devices, and apparatuses that support low latency transmission techniques for uplink power saving. Various aspects describe communications between a communication devices, such as a UE and a base station (e.g., an eNodeB (eNB), a next-generation NodeB or a giga-NodeB (either of which may be referred to as a gNB)) in which information transmitted by a UE may be retransmitted in accordance with reduced latency techniques. In some cases, a base station may configure a UE with a low latency mode indication that has one or more different retransmission timelines or repetition techniques relative to communications that are not associated with the low latency mode indication. In some cases, downlink control information (DCI) transmitted from a base station to a UE may include a resource grant for uplink resources for an uplink communication (e.g., for UE transmission of pose information of an XR application), and the low latency mode indication may signal, for example, that no retransmissions of the uplink communication, that a different retransmission timeline (e.g., hybrid automatic repeat request (HARQ) timeline) for low latency mode communications, that retransmissions may happen based on a particular timeline that is determined according to one or more timers (e.g., a HARQ retransmission timer or HARQ inactivity timer), or combinations thereof. Thus, the UE may adapt retransmission techniques based on low latency indications, which may result in improved latency for uplink transmission, as well as reduce power consumption for the UE. The present disclosure may, as a result, also promote higher reliability and low latency XR-related operations, among other benefits.

A method of wireless communication at a UE is described. The method may include receiving, from a base station, control information that indicates uplink resources for at least a first uplink communication from the UE to the base station and a latency indication that indicates that the first uplink communication has a latency equal to or below a latency threshold value, transmitting at least the first uplink communication to the base station using the uplink resources, and setting a retransmission parameter associated with the first uplink communication based on the latency indication.

An apparatus for wireless communication at a UE is described. The apparatus may include a processor, memory coupled with the processor, and instructions stored in the memory. The instructions may be executable by the processor to cause the apparatus to receive, from a base station, control information that indicates uplink resources for at least a first uplink communication from the UE to the base station and a latency indication that indicates that the first uplink communication has a latency equal to or below a latency threshold value, transmit at least the first uplink communication to the base station using the uplink resources, and set a retransmission parameter associated with the first uplink communication based on the latency indication.

Another apparatus for wireless communication at a UE is described. The apparatus may include means for receiving, from a base station, control information that indicates uplink resources for at least a first uplink communication from the UE to the base station and a latency indication that indicates that the first uplink communication has a latency equal to or below a latency threshold value, transmitting at least the first uplink communication to the base station using the uplink resources, and setting a retransmission parameter associated with the first uplink communication based on the latency indication.

A non-transitory computer-readable medium storing code for wireless communication at a UE is described. The code may include instructions executable by a processor to receive, from a base station, control information that indicates uplink resources for at least a first uplink communication from the UE to the base station and a latency indication that indicates that the first uplink communication has a latency equal to or below a latency threshold value, transmit at least the first uplink communication to the base station using the uplink resources, and set a retransmission parameter associated with the first uplink communication based on the latency indication.

In some examples of the method, apparatuses, and non-transitory computer-readable medium described herein, the latency indication includes a low latency mode flag that indicates whether the first uplink communication is to use a low latency communication mode that has different retransmission parameters than other communication modes. In some examples of the method, apparatuses, and non-transitory computer-readable medium described herein, the setting may include operations, features, means, or instructions for disabling retransmissions of the first uplink communication based on the latency indication. Some examples of the method, apparatuses, and non-transitory computer-readable medium described herein may further include operations, features, means, or instructions for emptying an uplink buffer associated with the first uplink communication after transmitting the first uplink communication. Some examples of the method, apparatuses, and non-transitory computer-readable medium described herein may further include operations, features, means, or instructions for disabling one or more feedback retransmission timers associated with the first uplink communication.

In some examples of the method, apparatuses, and non-transitory computer-readable medium described herein, the control information includes one or more parameters that are set to increase decoding probability of the first uplink communication. In some examples of the method, apparatuses, and non-transitory computer-readable medium described herein, the one or more parameters include one or more of a modulation and coding scheme parameter, a repetition parameter for transmitting multiple instances of the first uplink communication, a coding rate parameter, a transmit power parameter, or any combinations thereof.

In some examples of the method, apparatuses, and non-transitory computer-readable medium described herein, the setting may include operations, features, means, or instructions for determining, based on the latency indication, a feedback timer value associated with the first uplink communication. Some examples of the method, apparatuses, and non-transitory computer-readable medium described herein may further include operations, features, means, or instructions for receiving, from the base station, radio resource control signaling that includes a first timer value and a second timer value, and where the feedback timer value is set by selecting one of the first timer value and the second timer value based on the latency indication. In some examples of the method, apparatuses, and non-transitory computer-readable medium described herein, the first timer value provides a shorter time for retransmission of a first type of uplink communications (e.g., that include pose information for an extended reality application) than for other types of uplink communications.

In some examples of the method, apparatuses, and non-transitory computer-readable medium described herein, the setting further may include operations, features, means, or instructions for identifying a feedback timer associated with the first uplink communication based on the latency indication. In some examples of the method, apparatuses, and non-transitory computer-readable medium described herein, the feedback timer is determined based on one or more downlink communications received from the base station. In some examples of the method, apparatuses, and non-transitory computer-readable medium described herein, the feedback timer is selected from a retransmission timer or an inactivity timer associated with one or more feedback processes at the UE based on which of the retransmission timer or the inactivity timer has a shorter time duration from the first uplink communication.

Some examples of the method, apparatuses, and non-transitory computer-readable medium described herein may further include operations, features, means, or instructions for receiving a feedback communication from the base station that indicates the first uplink communication was not successfully decoded and that either the first uplink communication is to be retransmitted or a second uplink communication is to be transmitted, identifying that first uplink information included in the first uplink communication is stale, and transmitting the second uplink communication based on the identifying, where the second uplink communication includes second uplink information that is more recent than the first uplink information. In some examples of the method, apparatuses, and non-transitory computer-readable medium described herein, the first uplink information and the second uplink information include pose information, and where the second uplink information provides more recent pose information than the first uplink information. In some examples of the method, apparatuses, and non-transitory computer-readable medium described herein, the second uplink information provides for a reduced motion-to-render-to-photon (M2R2P) delay relative to a M2R2P delay associated with the first uplink information. Some examples of the method, apparatuses, and non-transitory computer-readable medium described herein may further include operations, features, means, or instructions for selecting one or more transmission parameters of the second uplink communication to provide increased reliability of the second uplink communication.

In some examples of the method, apparatuses, and non-transitory computer-readable medium described herein, the transmitting includes transmitting a set of repetitions of the first uplink communication, detecting an end-of-burst indication or a feedback inactivity timer expiration associated with the first uplink communication, and discontinuing transmission of the set of repetitions based on detection of the end-of-burst indication or the feedback inactivity timer expiration.

A method of wireless communication at a base station is described. The method may include transmitting, to a UE, control information that indicates uplink resources for at least a first uplink communication from the UE to the base station and a latency indication that indicates that the first uplink communication has a latency equal to or below a latency threshold value, receiving, from the UE, at least the first uplink communication, and setting a retransmission parameter associated with the first uplink communication based on the latency indication.

An apparatus for wireless communication at a base station is described. The apparatus may include a processor, memory coupled with the processor, and instructions stored in the memory. The instructions may be executable by the processor to cause the apparatus to transmit, to a UE, control information that indicates uplink resources for at least a first uplink communication from the UE to the base station and a latency indication that indicates that the first uplink communication has a latency equal to or below a latency threshold value, receive, from the UE, at least the first uplink communication, and set a retransmission parameter associated with the first uplink communication based on the latency indication.

Another apparatus for wireless communication at a base station is described. The apparatus may include means for transmitting, to a UE, control information that indicates uplink resources for at least a first uplink communication from the UE to the base station and a latency indication that indicates that the first uplink communication has a latency equal to or below a latency threshold value, receiving, from the UE, at least the first uplink communication, and setting a retransmission parameter associated with the first uplink communication based on the latency indication.

A non-transitory computer-readable medium storing code for wireless communication at a base station is described. The code may include instructions executable by a processor to transmit, to a UE, control information that indicates uplink resources for at least a first uplink communication from the UE to the base station and a latency indication that indicates that the first uplink communication has a latency equal to or below a latency threshold value, receive, from the UE, at least the first uplink communication, and set a retransmission parameter associated with the first uplink communication based on the latency indication.

In some examples of the method, apparatuses, and non-transitory computer-readable medium described herein, the latency indication includes a low latency mode flag that indicates whether the first uplink communication is to use a low latency communication mode that has different retransmission parameters than other communication modes. In some examples of the method, apparatuses, and non-transitory computer-readable medium described herein, the setting may include operations, features, means, or instructions for disabling retransmissions of the first uplink communication based on the latency indication. Some examples of the method, apparatuses, and non-transitory computer-readable medium described herein may further include operations, features, means, or instructions for disabling one or more feedback processes associated with the first uplink communication.

In some examples of the method, apparatuses, and non-transitory computer-readable medium described herein, the control information includes one or more parameters that are set to increase decoding probability of the first uplink communication. In some examples of the method, apparatuses, and non-transitory computer-readable medium described herein, the one or more parameters include one or more of a modulation and coding scheme parameter, a repetition parameter for transmitting multiple instances of the first uplink communication, a coding rate parameter, a transmit power parameter, or any combinations thereof.

In some examples of the method, apparatuses, and non-transitory computer-readable medium described herein, the setting may include operations, features, means, or instructions for determining, based on the latency indication, a feedback timer value associated with the first uplink communication. Some examples of the method, apparatuses, and non-transitory computer-readable medium described herein may further include operations, features, means, or instructions for transmitting, to the UE, radio resource control signaling that includes a first timer value and a second timer value, and where the feedback timer value is set by selecting one of the first timer value and the second timer value based on the latency indication. In some examples of the method, apparatuses, and non-transitory computer-readable medium described herein, the first timer value provides a shorter time for providing feedback information for a first type of uplink communications (e.g., that include pose information for an extended reality application) than for other types of uplink communications.

In some examples of the method, apparatuses, and non-transitory computer-readable medium described herein, the setting further may include operations, features, means, or instructions for identifying a feedback timer associated with the first uplink communication based on the latency indication. In some examples of the method, apparatuses, and non-transitory computer-readable medium described herein, the feedback timer is selected from a retransmission timer or an inactivity timer associated with one or more feedback processes at the UE based on which of the retransmission timer or the inactivity timer has a shorter time duration from the first uplink communication.

Some examples of the method, apparatuses, and non-transitory computer-readable medium described herein may further include operations, features, means, or instructions for determining that the first uplink communication is not successfully decoded, transmitting a feedback communication to the UE that indicates the first uplink communication was not successfully decoded and that either the first uplink communication is to be retransmitted or a second uplink communication is to be transmitted, and receiving the second uplink communication responsive to the feedback communication, where the second uplink communication includes second uplink information that is more recent than first uplink information transmitted in the first uplink communication. In some examples of the method, apparatuses, and non-transitory computer-readable medium described herein, the first uplink information and the second uplink information include pose information, and where the second uplink information provides more recent pose information than the first uplink information. In some examples of the method, apparatuses, and non-transitory computer-readable medium described herein, the second uplink information provides for reduced motion-to-render-to-photon (M2R2P) delay relative to a M2R2P delay associated with the first uplink information. In some examples of the method, apparatuses, and non-transitory computer-readable medium described herein, the second uplink communication uses one or more transmission parameters that are selected to provide increased reliability of the second uplink communication.

Some examples of the method, apparatuses, and non-transitory computer-readable medium described herein may further include operations, features, means, or instructions for configuring the UE to transmit a set of repetitions of the first uplink communication and to discontinue transmission of the set of repetitions based on detection of an end-of-burst indication or feedback inactivity timer expiration.

DETAILED DESCRIPTION

Figure 1:
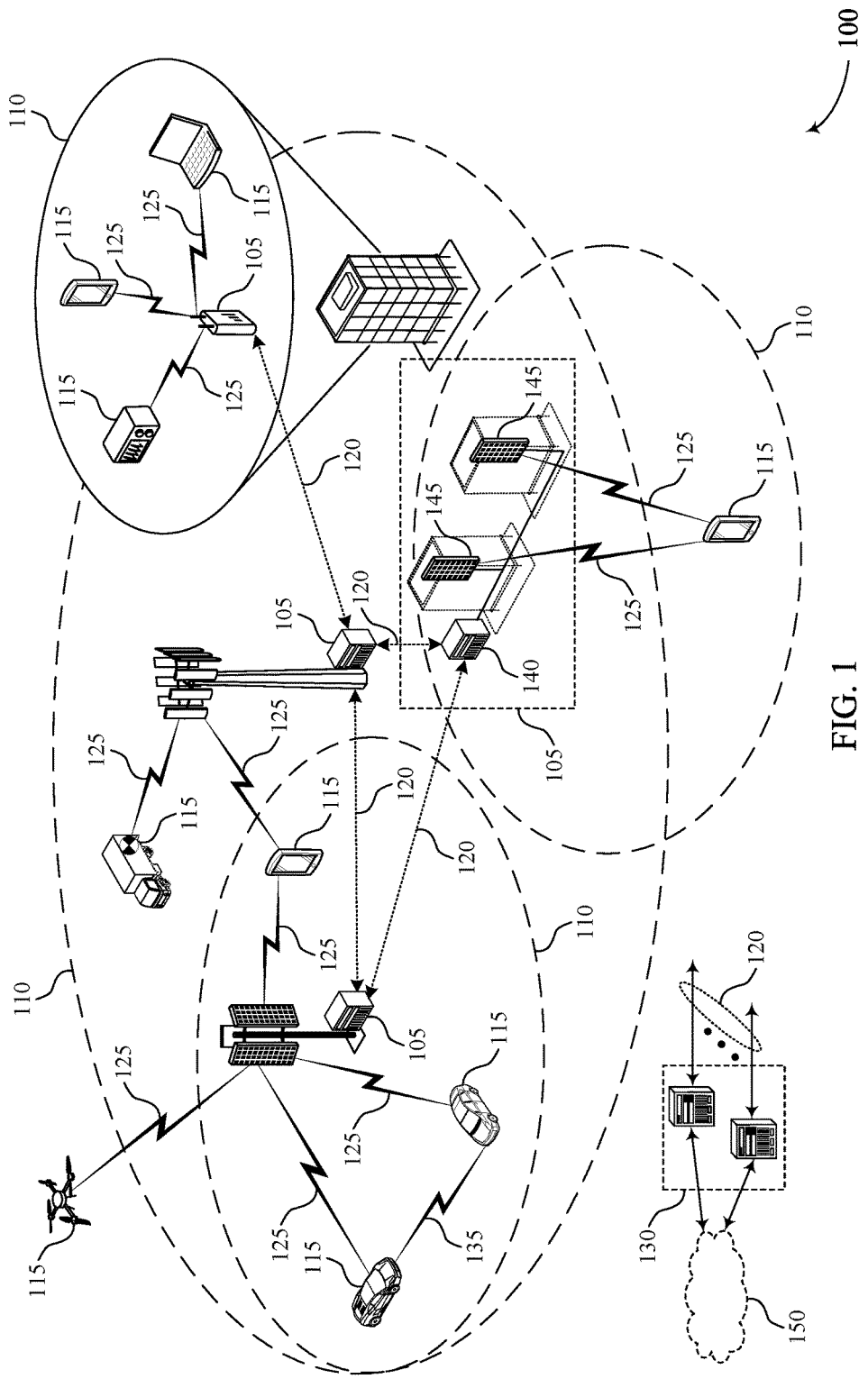
FIGS. 1 and 2 illustrate examples of wireless communications systems that support adaptive configured grant for power saving in accordance with aspects of the present disclosure.

Some wireless communication systems may include communication devices, such as UEs and base stations (e.g., eNBs, next-generation NodeBs or giga-NodeBs (either of which may be referred to as a gNB)) that may support multiple radio access technologies. Examples of radio access technologies include 4G systems such as LTE systems and 5G systems which may be referred to as NR systems. A UE may support various types of applications, such as XR applications, which may have periodic or semi-periodic data traffic. The applications may be hosted by a server as described herein. The server may transmit the periodic or semi-periodic data traffic to a base station, which may forward the data traffic to the UE.

In XR applications, features from the real and virtual environments may be overlaid and displayed to a user for consumption via the UE. To avoid visual conflicts, such as misaligning objects from the real and virtual environments, and other visual conflicts, the UE may sense, generate, and send pose information to a network (e.g., a base station, a server hosting the XR application). The pose information may define a position and orientation of the UE (or user) in space relative to the real and virtual environments. The UE may send the pose information and/or other control information according to a periodicity that is associated with a frame rate of an XR application. In some cases, the UE may be provided with a configured grant that may allocate periodic resources (also referred to as configured grant resources), which the UE may use for downlink reception or uplink transmission, or both. In other cases, the base station may provide dynamic grants to the UE. In cases where dynamic grants are provided, (e.g., in DCI from the base station to the UE), the base station may configure one or more retransmission parameters that are suited for XR application. In some cases, the DCI may include a low latency mode indication that indicates to the UE that one or more retransmission parameters for the associated uplink communication (e.g., XR pose information) are different from other uplink communications of the UE. In some cases, the UE may be configured to monitor for the low latency mode indication such as, for example, through an activation (or deactivation) of low latency mode XR communications by RRC signaling, L1/L2 control signaling (e.g., MAC-CE signaling), or any combinations thereof.

In some examples, the low latency mode indication may signal, for example, that no retransmissions of the uplink communication are to be provided. In such cases, following the transmission of the uplink communication, the UE may flush the associated buffer and not perform monitoring for feedback (e.g., HARQ feedback) that indicates whether the communication was successfully received. In other examples, the low latency mode indication may signal that a different retransmission timeline (e.g., HARQ timeline) for low latency mode communications is associated with the uplink communication. For example, for low latency communications, the base station may use a HARQ process with shorter retransmission timer (e.g., a HarqRetransmissionTimerUL value) for pose information transfer to achieve faster retransmission, and other HARQ processes used for other types traffic could use a regular (e.g., longer) timer value. In other examples, the low latency mode indication may signal that retransmissions may happen based on a particular timeline that is determined according to a shorter of multiple timers (e.g., the shorter of a HARQ retransmission timer or HARQ inactivity timer). Additionally or alternatively, in cases where the UE receives an indication to retransmit the uplink communication (e.g., based on a HARQ negative acknowledgment (NACK) indication) the UE may transmit previously transmitted pose information, or the UE may transmit updated pose information that is obtained subsequent to prior pose information that was transmitted in the initial uplink communication.

Aspects of the subject matter described in this disclosure may be implemented to realize one or more of the following potential improvements, among others. The techniques employed by the UE may provide benefits and enhancements to the operation of the UE. For example, operations performed by the UE may provide power saving improvements to the UE (e.g., through reduced monitoring and transmission durations). In some examples, configuring the UE to operate in a low latency mode may promote higher reliability and lower latency XR-related operations, among other benefits.

Aspects of the disclosure are initially described in the context of wireless communications systems. Aspects of the disclosure are further illustrated by and described with reference to apparatus diagrams, system diagrams, and flowcharts that relate to low latency transmission techniques for uplink power saving.

FIG. 1 illustrates an example of a wireless communications system 100 that supports low latency transmission techniques for uplink power saving in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

The base station 105 and the UE 115 may support various types of applications that may have periodic or semi-periodic data traffic. The base station 105 may be in wireless communication with a server (not shown), which may provide the periodic or semi-periodic data traffic to the base station 105 to forward to the UE 115. The server may be a cloud server, a server associated with an application subscription provider, proxy server, web server, application server, or any combination thereof. The server may include an application distribution platform. The application distribution platform may allow the UE 115 to discover, browse, share, and download applications via the base station 105, and therefore provide a digital distribution of the application from the application distribution platform. As such, a digital distribution may be a form of delivering content such as data, without the use of physical media but over online delivery mediums, such as the Internet. For example, the UE 115 may upload or download applications for streaming, downloading, uploading, or processing, data (e.g., images, audio, video). The server may also transmit to the UE 115 a variety of information, such as instructions or commands to download applications on the UE 115 via the base station 105.

By way of example, the base station 105 and the UE 115 may support XR applications, which may have periodic or semi-periodic XR data traffic. An XR application may support various frame rates, for example 60 frames per second (fps) frame rates or 120 fps frame rates. The server may generate an XR frame at 60 fps, which may correspond to a periodicity of 16.67 ms. Alternatively, the server may generate an XR frame at 120 fps, which may correspond to a periodicity of 8.33 ms. The server may transmit the periodic or semi-periodic XR data traffic to the base station 105, which may forward the XR data traffic to the UE 115. The server may divide the XR data traffic into multiple slices (also referred to as files) and encode each slice separately, and transmit the encoded slices to the base station 105, which may forward the XR data traffic to the UE 115 using multiple TBs (also referred to as a burst of TBs).

For XR applications features from the real and virtual environments may be overlaid and displayed to a user for consumption via the UE 115. To avoid visual conflicts, such as misaligning objects from the real and virtual environments, among other visual conflicts, the UE 115 may generate and send pose information to a network (e.g., a server hosting the XR application). The pose information may define a position and orientation of the UE 115 (or user) in space relative to the real and virtual environments. In some cases, different applications may have different uplink data flows.

For VR applications there may be a single uplink data flow. For example, the UE 115 may generate pose information (e.g., six degree of freedom (6 DOF) pose information) and other control information. In some examples, the UE 115 may generate or transmit the pose information based on a data rate (e.g., 0.5-2 Mbps). The UE 115 may transmit the pose information and other control information based on an uplink transmit periodicity (e.g., 2 mn (500 Hz)). In some examples, the pose information and other control information may have different file sizes (e.g., 0.5 Mbit/500=1 Kbit=125 byte, 2 Mbit/500=4 Kbit=500 byte). An FDP may be 1.25 ms to 10 ms.

For AR applications there may be two uplink data flows. As part of the first uplink data flow, the UE 115 may generate pose information (e.g., 6 DOF pose information) and other control information. The UE 115 may generate or transmit the pose information based on a data rate (e.g., 0.5-2 Mbps). The UE 115 may transmit the pose information and other control information based on an uplink transmit periodicity (e.g., 2 mn (500 Hz)). Similarly, for the AR applications, the FDP may be 1.25 ms to 10 ms. As part of the second uplink data flow, the UE 115 may generate pose information for a scene update associated with the AR applications. For scene updates, the UE 115 may generate or transmit the pose information based on a data rate (e.g., 10 Mbps at 10 Hz). In some examples, the pose information may have different file sizes (e.g., 1 Mbits per 100 ms=125 kbyte). An FDB may be 100 ms.

The UE 115 may benefit from the periodic or semi-periodic data traffic, and more specifically from the transmission delay between bursts of TBs carrying the periodic or semi-periodic data traffic to implement various operations to reduce power consumption. The UE 115 may send the pose information and/or other control information in accordance with a configured grant or a dynamic grant, which, in some cases, may configure the UE 115 with a set of parameters to use when transmitting the pose information and/or other control information to the network. Various aspects of the present disclosure relate to configuring the UE 115 with retransmission parameters that are based on a low latency mode indication that is associated with a particular communication. Thus, the UE 115 may adapt retransmission parameters based on such a low latency mode indication, which may result in improved reliability and latency for XR applications, and reduced power consumption for the UE 115.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
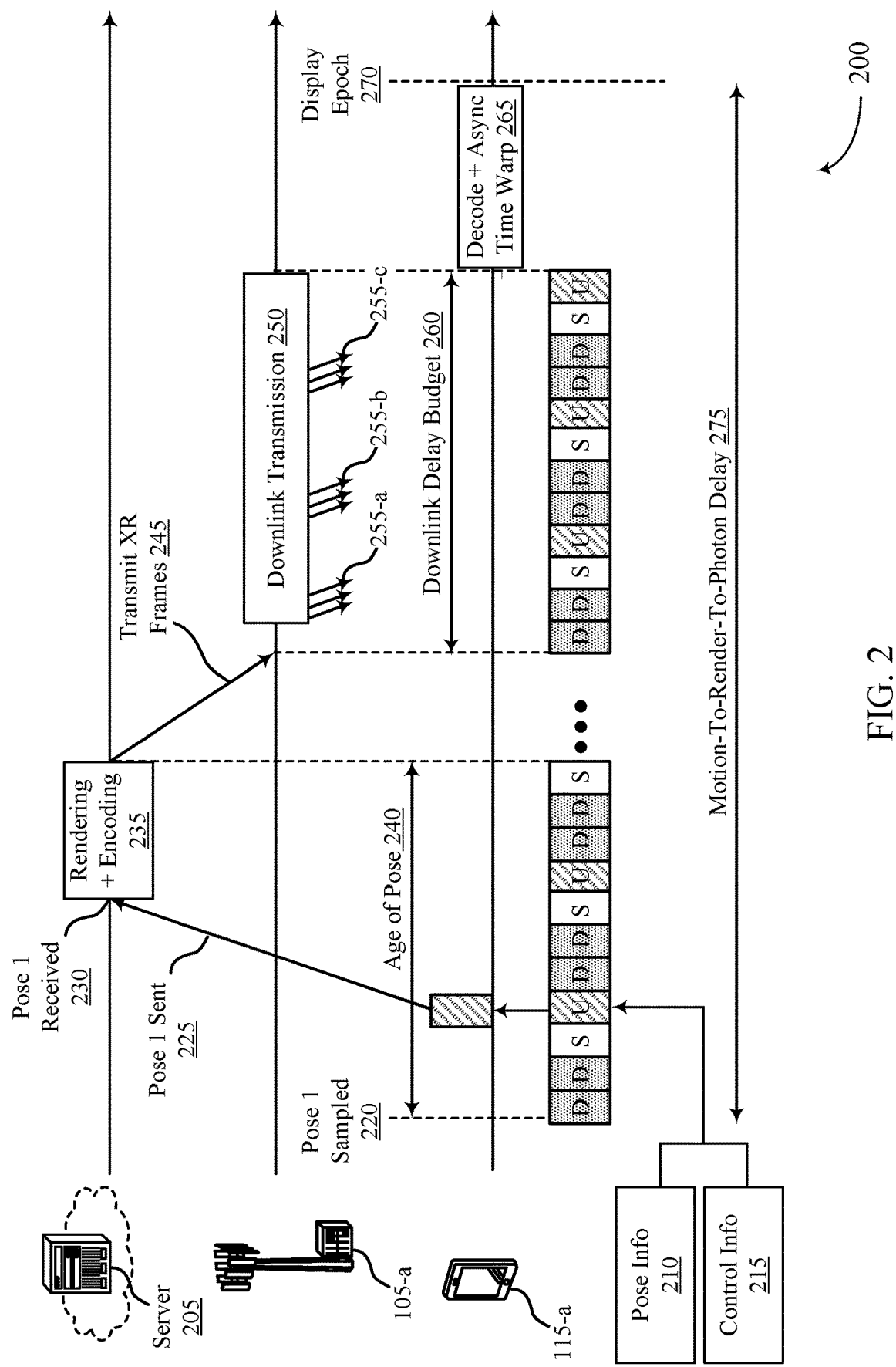

FIG. 2 illustrates an example of a wireless communications system 200 that supports low latency transmission techniques for uplink power saving in accordance with aspects of the present disclosure. In some examples, wireless communications system 200 may implement aspects of wireless communications system 100. For example, the wireless communications system 200 may include a base station 105-a and a UE 115-a, which may be examples of a base station 105 and a UE 115 as described herein. The wireless communications system 200 may also include a server 205, which may be an example of an XR server as discussed herein. The wireless communications system 200 may support multiple radio access technologies including 4G systems such as LTE systems, LTE-A systems, or LTE-A Pro systems, and 5G systems, which may be referred to as NR systems. The wireless communications system 200 may include features for improvements to power savings and, in some examples, may promote high reliability and low latency uplink operations for power saving, among other benefits.

In the example of FIG. 2, the base station 105-a and the UE 115-a may support various types of applications that may have periodic or semi-periodic data traffic. The base station 105-a may be in wireless or wired communication with the server 205, which may provide the periodic or semi-periodic data traffic to the base station 105-a to forward to the UE 115-a. The server 205 may be a cloud server, a server associated with an application subscription provider, proxy server, web server, application server, or any combination thereof. The server 205 may include an application distribution platform. The application distribution platform may allow the UE 115-a to discover, browse, share, and download applications via the base station 105-a, and therefore provide a digital distribution of the application from the application distribution platform. As such, a digital distribution may be a form of delivering content such as data, without the use of physical media but over online delivery mediums, such as the Internet. For example, the UE 115-a may upload or download applications for streaming, downloading, uploading, or processing, data (e.g., images, audio, video). The server 205 may also transmit to the UE 115-a a variety of information, such as instructions or commands to download applications on the UE 115-a via the base station 105-a.

By way of example, the base station 105-a and the UE 115-a may support XR applications, which may have periodic or semi-periodic XR data traffic. For XR-related applications, the UE 115-a may generate and send pose information 210, as well as other control information 215 to the server 205 (e.g., a server hosting the XR application) via the base station 105-a. The pose information 210 may define a pose, a posture, a position, an orientation, or a movement of the UE 115-a (or a user of the UE 115-a), and may be acquired via imaging devices including head-mounted units (HMUs), head-mounted displays (HMDs), external imaging devices, or any combination thereof. The pose information 210 may thereby include data regarding the freedom of movement of the UE 115-a (or the user), and may be characterized by six degrees of freedom in which a user/object may change position (e.g., translation upwards/downwards, translation left/right, translation forwards/backwards, pitch, yaw, roll). The control information 215 may refer to other inputs or commands input by a user, such as movement/commands with a joystick, controller, or other device. The UE 115-a may additionally acquire scene information. The scene information may include images and/or video of a surrounding physical or virtual environment, and may be acquired in the context of XR applications along with the pose information 210 or the control information 215, or both.

With reference to FIG. 2, the UE 115-a may, at 220, sample the pose information 210, the control information 215, the scene information, or any combination thereof. The UE 115 may thereby acquire information, at 220, which is to be transmitted to the server 205 and/or the base station 105-a. For example, the UE 115-a may sample Pose 1 at 220. In some examples, the pose information 210 and the control information 215 may be acquired (e.g., sampled) at a data rate of approximately 0.5-2 Mbps, and may be transmitted to the server 205 approximately every 2 ms (e.g., 500 Hz). Additionally, the pose information 210, the control information 215, or both, may be sampled and/or transmitted with a file size of 1 Kbit (e.g., 125 bytes), or 4 Kbit (e.g., 500 bytes). Comparatively, the scene information may be acquired (e.g., sampled) at a data rate of approximately 10 Mbps, and may be transmitted to the server 205 at a rate of 10 Hz. Additionally, the scene information may be sampled and/or transmitted with a file size of 1 Mbits per 100 ms (e.g., 125 Kbytes).

At 225, the UE 115-a may transmit the sampled information (transmit Pose 1) to the server 205. In some aspects, the UE 115-a may transmit the sampled information within the first uplink symbol following the time in which the information (e.g., the pose information 210, the control information 215, scene information) was sampled. At 230, the sampled information may be received at the server 205. At 235, the server 205 may render and encode a new XR frame based on (e.g., according to) the received information (Pose 1). In some aspects, XR frames may be generated periodically, and may be divided into multiple slices that are encoded separately. As shown in FIG. 2, the age of acquired information (e.g., age of pose 240) may be defined as the duration between when the information was sampled (e.g., Pose 1 sampled at 220) and when the XR is rendered and/or encoded at the server 205.

At 235, the XR frame may be transmitted to the base station 105-a. In some aspects, each encoded slide (of file) of the XR frame may be transmitted from the server 205 to the base station 105-a separately. At 250, the base station 105-a may transmit the received XR frames to the UE 115-a. In some aspects, the slices of the XR frame may be transmitted through multiple TBs, or a burst of TBs, to the UE 115-a. For example, the base station 105-a may transmit data to the UE 115-a via XR frame bursts 255 (e.g., first XR frame burst 255-a, second XR frame burst 255-b, and third XR frame burst 255-c). Each XR frame burst 255 may have a transmission delay requirement, and the downlink transmission from the base station 105-a to the UE 115-a may be characterized by a downlink delay budget 260. At 265, the UE 115-a may decode the data received from the base station 105-a (e.g., decode XR frame bursts 255) and perform asynchronous time warp procedures. Subsequently, at 270, the received XR frames may be displayed at the UE 115-a.

The transmission of the pose information 210 and/or other control information by the UE 115-a, in some cases, may occur at periodicity different from a periodicity of the frame bursts 255. For example, the UE 115-a may transmit the pose information 210 to the server 205 and/or the base station 105-a according to dynamic grants, which may define a set of parameters (e.g., MCS, TBS, etc.) for the UE 115-a to use for the transmission of the pose information 210 and other control information to the server 205 and/or the base station 105-a. In some cases, however, retransmission procedures (e.g., HARQ retransmission procedures) associated with wireless communications may provide retransmission timelines that are inconsistent with pose periodicity, and retransmissions may thus add unwanted latency for the XR application or provide stale pose information.

In the wireless communications system 200, the UE 115-a may be configured to monitor for a low latency mode indication with DCI that provides a dynamic uplink grant for communications (e.g., for uplink communications with pose information). In some cases, the low latency mode indication may signal, for example, that no retransmissions of the uplink communication are to be provided. In such cases, following the transmission of the uplink communication, the UE 115-a may flush the associated buffer and not perform monitoring for feedback (e.g., HARQ feedback) that indicates whether the communication was successfully received (e.g., the UE may skip tracking of uplink transmissions associated with low latency communications). In other examples, the low latency mode indication may signal that a different retransmission timeline (e.g., HARQ timeline) for low latency mode communications is associated with the uplink communication. For example, for low latency communications, the base station may use a HARQ process with shorter retransmission timer (e.g., a HarqRetransmissionTimerUL value) for pose information transfer to achieve faster retransmission, and other HARQ processes used for other types traffic could use a regular (e.g., longer) timer value. In other examples, the low latency mode indication may signal that retransmissions may happen based on a particular timeline that is determined according to a shorter of multiple timers (e.g., the shorter of a HARQ retransmission timer or HARQ inactivity timer). Additionally or alternatively, in cases where the UE 115-a receives an indication to retransmit the uplink communication (e.g., based on a HARQ negative acknowledgment (NACK) indication) the UE 115-a may transmit previously transmitted pose information, or the UE 115-a may transmit updated pose information that is obtained subsequent to prior pose information that was transmitted in the initial uplink communication.

For power saving, downlink reception and uplink transmission can be synchronized, so that the UE 115 may receive downlink frame and send uplink pose information simultaneously or proximate in time. In some examples, if a number of frames generated per second is changed from the server 205 (encoder) for adaption, then the base station 105 can also change its physical layer parameter and one or more retransmission parameters to adapt its resource to match with the reduced frame rates. Using downlink signaling, the base station 105 may indicate one or more low latency mode parameters, a low latency mode indication, or any combinations thereof.

Figure 3:
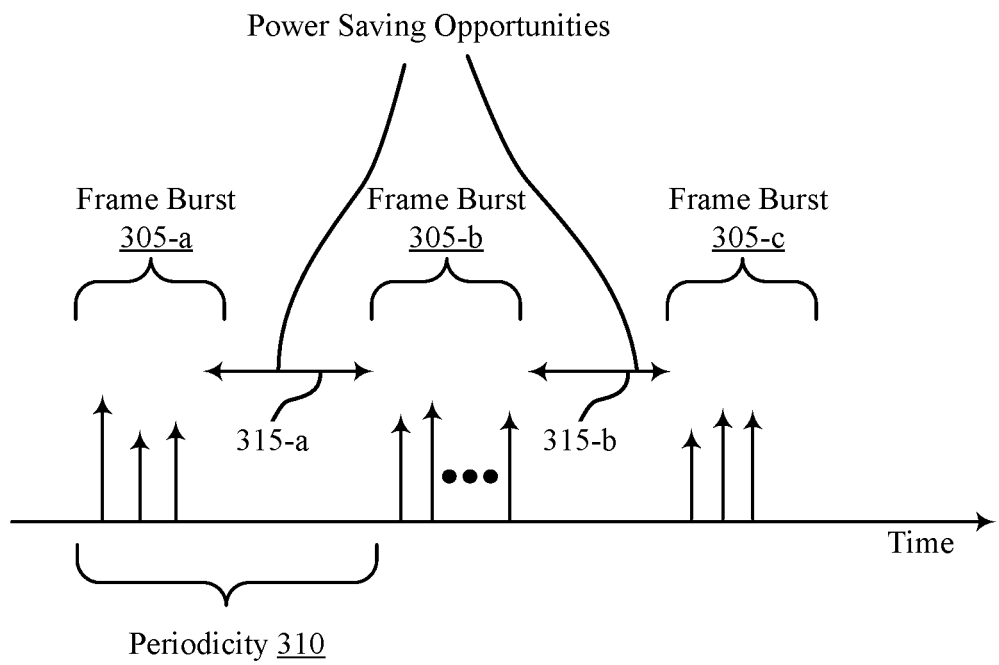
FIG. 3 illustrates an example of a downlink and uplink configuration that supports low latency transmission techniques for uplink power saving in accordance with aspects of the present disclosure.

FIG. 3 illustrates an example of a downlink and uplink configuration 300 that supports low latency transmission techniques for uplink power saving in accordance with aspects of the present disclosure. In some examples, downlink and uplink configuration 300 may implement aspects of wireless communications system 100 and 200 as described with reference to FIGS. 1 and 2. respectively. The downlink and uplink configuration 300 may be based on a configuration by a base station 105, and implemented by a UE 115. The downlink and uplink configuration 300 may configure time resources (e.g., symbols, minislots, slots) as well as frequency resources (e.g., carriers, subcarriers). The downlink and uplink configuration 300 may support multiple radio access technologies including 4G systems such as LTE systems, LTE-A systems, or LTE-A Pro systems, and 5G systems which may be referred to as NR systems.

The base station 105 may transmit, and the UE 115 may receive, one or more frame bursts 305 carrying one or more frames associated with an application. For example, the base station 105 may transmit, and the UE 115 may receive, one or more XR frame bursts carrying one or more XR frames associated with an XR application. A frame may be divided into multiple slices that may be separately encoded. The base station 105 may transmit the encoded slices over the air through multiple TBs (a burst of TBs). In some examples, the base station 105 may transmit the frame bursts 305 according to a periodicity 310 (e.g., a frame generation periodicity), which may be based on a frame rate of an application, such as an XR application (e.g., a 60 Hz or 120 Hz frame rate, which provide a frame generation periodicity of 16.67 ms or 8.33 ms, respectively). The UE 115 may thereby receive the frame bursts 305 based on the periodicity 310. In the example of FIG. 3, there may be one or more power saving opportunities 315 between the frame bursts 305 for the UE 115 to experience added power savings.

In some cases, the low latency mode indication may provide that uplink retransmissions, if used, are provided in accordance with the frame bursts 305 based at least in part on the periodicity 310. For example, the UE 115 may be configured with one or more retransmission timers that provide for retransmissions to occur within a frame burst 305 and thus allow for power savings at the UE 115 during a power saving opportunity 315 between two consecutive frame bursts (e.g., by powering down transmit/receive circuitry). In some cases, to benefit from the power saving opportunities 315, the UE 115 may be configured with multiple set of retransmission parameters, and the UE 115 may select a set of parameters based on a frame burst periodicity. Thus, the UE 115 may use retransmission parameters that may result in improved latency for XR applications and reduced power consumption for the UE 115.

Figure 4A:
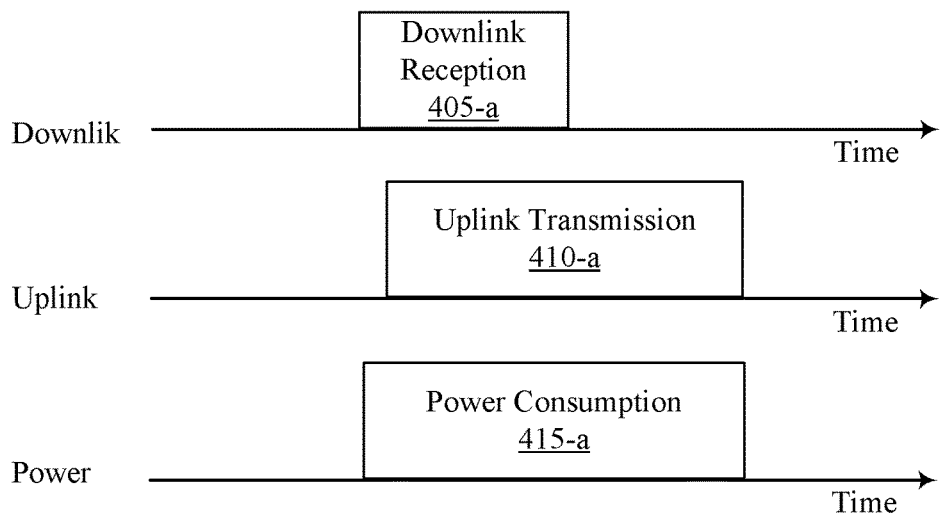
FIGS. 4A and 4B illustrate examples of transmission configurations that support low latency transmission techniques for uplink power saving in accordance with aspects of the present disclosure.
Figure 4B:
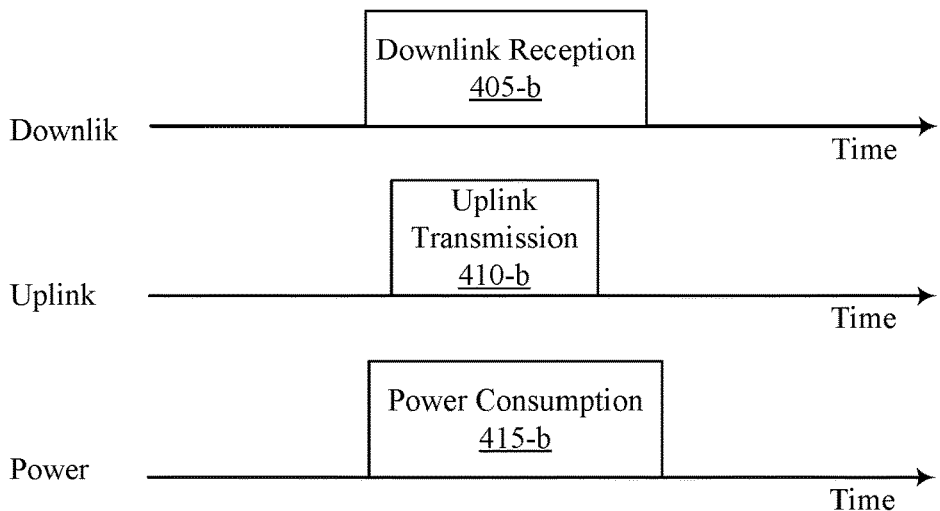

FIGS. 4A and 4B illustrate examples of transmission configurations 400 that support low latency transmission techniques for uplink power saving in accordance with aspects of the present disclosure. In some examples, transmission configurations 400 may implement aspects of wireless communications systems 100 or 200. For example, the transmission configuration 400-a may be based on a configuration by a base station 105 and implemented by a UE 115. In the example of FIG. 4A, the base station 105 may transmit, and the UE 115 may receive, a dynamic grants for downlink receptions 405-a and uplink transmissions 410-a. For example, the base station 105 may transmit, and the UE 115 may receive, a grant via DCI from the base station 105.

In some cases, such as illustrated in FIG. 4A, the UE 115 may not receive a low latency mode indication (e.g., a low latency mode bit or flag in DCI may be set to indicate low latency mode is not configured). In such a case, downlink reception 405-a may include an indication to retransmit a prior uplink communication in accordance with relatively long retransmission timelines, the uplink transmission 410-a timeline may be extended due to the potential retransmission, and thus the UE 115 awake time is extended which thereby results in a period of increased UE power consumption 415-a that is longer than a duration that would be needed for downlink reception 405-a and uplink transmission of pose information.

In some cases, such as illustrated in FIG. 4B, the base station 105 may transmit, and the UE 115 may receive, a low latency mode indication in a DCI communication that may indicate one or more retransmission parameters associated with the uplink communications of the UE 115. For example, the retransmission parameter may provide that no retransmissions of uplink communications are to be provided when the low latency mode is indicated, or that a shorter retransmission timeline is used when the low latency mode is indicated. In the example of FIG. 4B, low latency mode indication may result in the UE 115 using retransmission parameters that provide that the uplink transmission 410-b spans fewer time resources than downlink reception 405-b, and the power consumption 415-b associated with radio components corresponds to the timing of the downlink reception 405-b.

In some cases, the low latency mode indication provided in DCI that allocates uplink resources may signal, for example, that no retransmissions of the uplink communication are to be provided. In such cases, following the transmission of the uplink communication, the UE 115 may flush the associated buffer and not perform monitoring for feedback (e.g., HARQ feedback) or retransmission, and thus may power down radio components subsequent to the uplink transmission 410-b. For example, the UE 115 may skip running a HARQ-RTT-timer and HarqRetransmissionUL timer since there will be no retransmission. In some cases, other indicated information in the DCI may be selected by the base station to increase decoding probability at the base station 105. For example, the base station 105 may configure a relatively conservative modulation and coding scheme (MCS), a repetition scheme (e.g., for the UE 115 to transmit multiple repetitions of the uplink information), a lower coding rate, a UE transmit power indication for boosting transmit power, or any combinations thereof.

In other cases, the low latency mode indication may signal that a different retransmission timeline (e.g., HARQ timeline) for low latency mode communications is associated with the uplink communication and thus the UE 115 may power down radio components subsequent to the uplink transmission 410-b. For example, a low latency mode field in DCI may indicate that the UE is to use a different RRC configured HarqRetransmissionTimerUL value for the current transport block (TB). In such cases, for low latency transmissions, the base station 105 may use a HARQ process with a shorter HarqRetransmissionTimerUL value for pose information transfer to achieve fast retransmission. Other HARQ processes used for other types traffic could use regular (e.g., longer) values for the retransmission timer. Using a short value for such a timer may reduce the overall time required for transmitting the TB. In some cases, the retransmission timer value may be indicated to the UE in RRC configuration or in a MAC-CE that provides configured timer values. In other examples, the low latency mode indication may signal that retransmissions may happen based on a particular timeline that is determined according to a shorter of multiple timers (e.g., the shorter of a HARQ retransmission timer or HARQ inactivity timer), such as illustrated in the examples of FIGS. 5A and 5B.

Figure 5A:
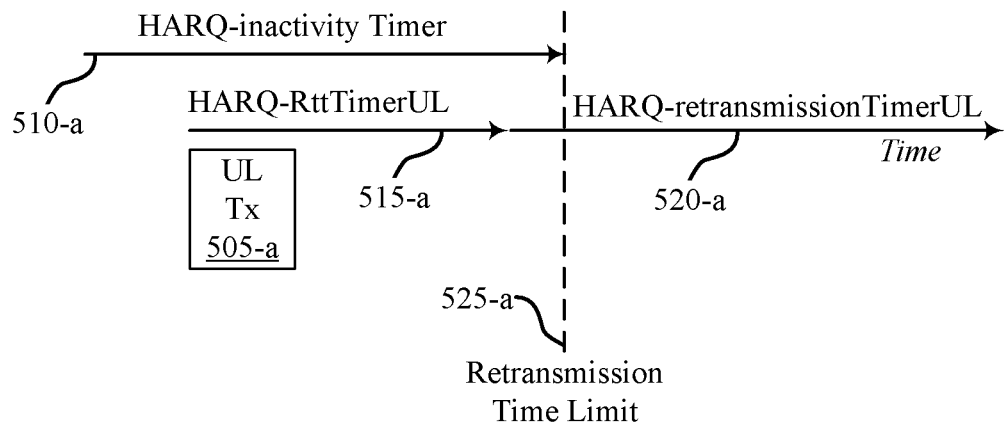
FIGS. 5A and 5B illustrate examples of retransmission timelines that supports low latency transmission techniques for uplink power saving in accordance with aspects of the present disclosure.
Figure 5B:
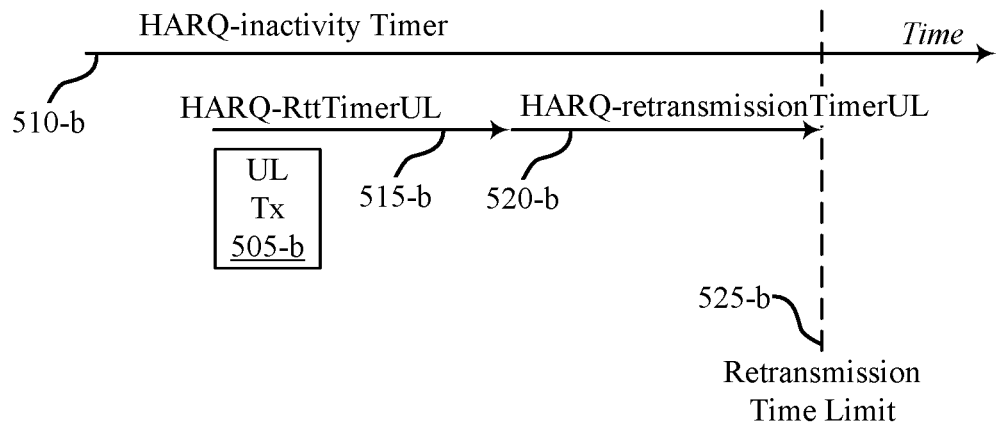

FIGS. 5A and 5B illustrate examples of retransmission timelines 500 that support low latency transmission techniques for uplink power saving in accordance with aspects of the present disclosure. In some examples, retransmission timelines 500 may implement aspects of wireless communications system 100 or 200. The timelines 500 may be based on a configuration by a base station 105 and implemented by a UE 115 to promote power saving for the UE 115 and lower latency uplink communications by selecting a set of retransmission parameters based on a low latency mode indication. The timelines 500 may also be based on a configuration by the base station 105 and implemented by the UE 115 to promote high reliability and low latency uplink operations, among other benefits.

With reference to the timelines 500 of FIG. 5, the low latency mode indication may signal that a potential retransmission can happen for a TB until the time that whichever of a corresponding retransmission timer or inactivity timer expires. For example, in the example timeline 500-a of FIG. 5A, a HARQ inactivity timer 510-a may be configured that expires prior to a HARQ RTT timer 515-a and a HARQ retransmission timer 520-a. In such a case, a timeline 525-a for retransmission of uplink transmission 505-a corresponds to the earlier expiring HARQ inactivity timer 510-a. In the example timeline 500-b of FIG. 5B, the HARQ inactivity timer 510-a may expire later than the HARQ RTT timer 515-b and the HARQ retransmission timer 520-b. In such a case, a timeline 525-b for retransmission of uplink transmission 505-b corresponds to the earlier expiring HARQ retransmission timer 520-b. Thus, in such cases, retransmission of uplink communications may be supported, but the time for retransmission limited within the timeline determined by downlink activity.

Figure 6:
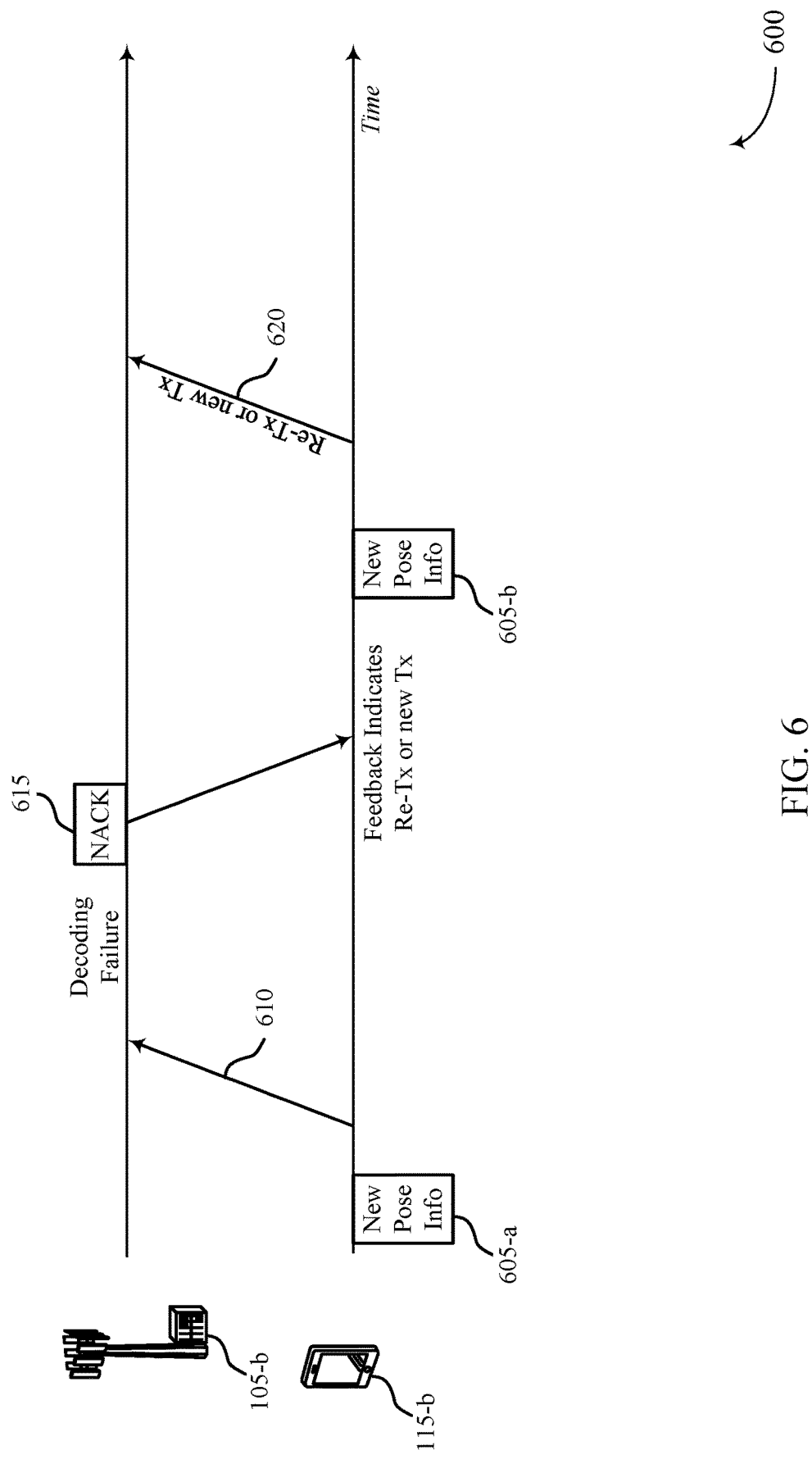
FIG. 6 illustrates an example of a new pose transmission or prior pose retransmission that supports low latency transmission techniques for uplink power saving in accordance with aspects of the present disclosure.

FIG. 6 illustrates an example of a new pose transmission or prior pose retransmission 600 that supports low latency transmission techniques for uplink power saving in accordance with aspects of the present disclosure. In some examples, new pose transmission or prior pose retransmission 600 may implement aspects of wireless communications system 100 or 200. For example, a base station 105-b and a UE 115-b, which may be examples of a base station 105 and a UE 115 as described herein, may communicate information associated with an XR application and XR server.

In this example, the UE 115-b may support retransmissions of pose information (e.g., using one or more techniques as discussed herein, or according to legacy retransmission techniques and timelines). In this case, the UE 115-b may sample new pose information 605 according to a sampling rate, which provides a first pose information 605-a and a second pose information 605-b sampling. At 610, the UE 115-b may transmit the first pose information 605-a to the base station 105-b, and the base station 105-b may experience a decoding failure. Based on the decoding failure, the base station 105-b may generate a NACK indication 615 that is transmitted to the UE 115-b (e.g., a HARQ NACK indication). Based on the NACK indication 615, the UE 115-b may determine to perform a retransmission 620 to the base station 105-b. In some cases, the base station 105-b may indicate either retransmission of first pose information 605-a or transmission of most recent new pose information if available, which corresponds to second pose information 605-b in this example. Thus, in this example, since more up to date pose information of the second pose information 605-b is available, the UE 115-b may transmit the second pose information 605-b to the base station 105-b in the retransmission 620. Such a technique may provide that the retransmission 620 does not contain stale pose information. In some cases, pose information 605 may be generated relatively frequently (e.g., every 2 ms), and sending the most recent pose information may be helpful in reducing M2R2P (Motion to Render to Photon) delay. In some cases, the base station 105-b, based on providing the indication to the UE 115-b that a retransmission of pose information or new transmission of new pose information may be transmitted, may provide one or more transmission parameters that provide enhanced reliability (e.g., repetition, increased transmit power, lower MCS, etc.).

Figure 7:
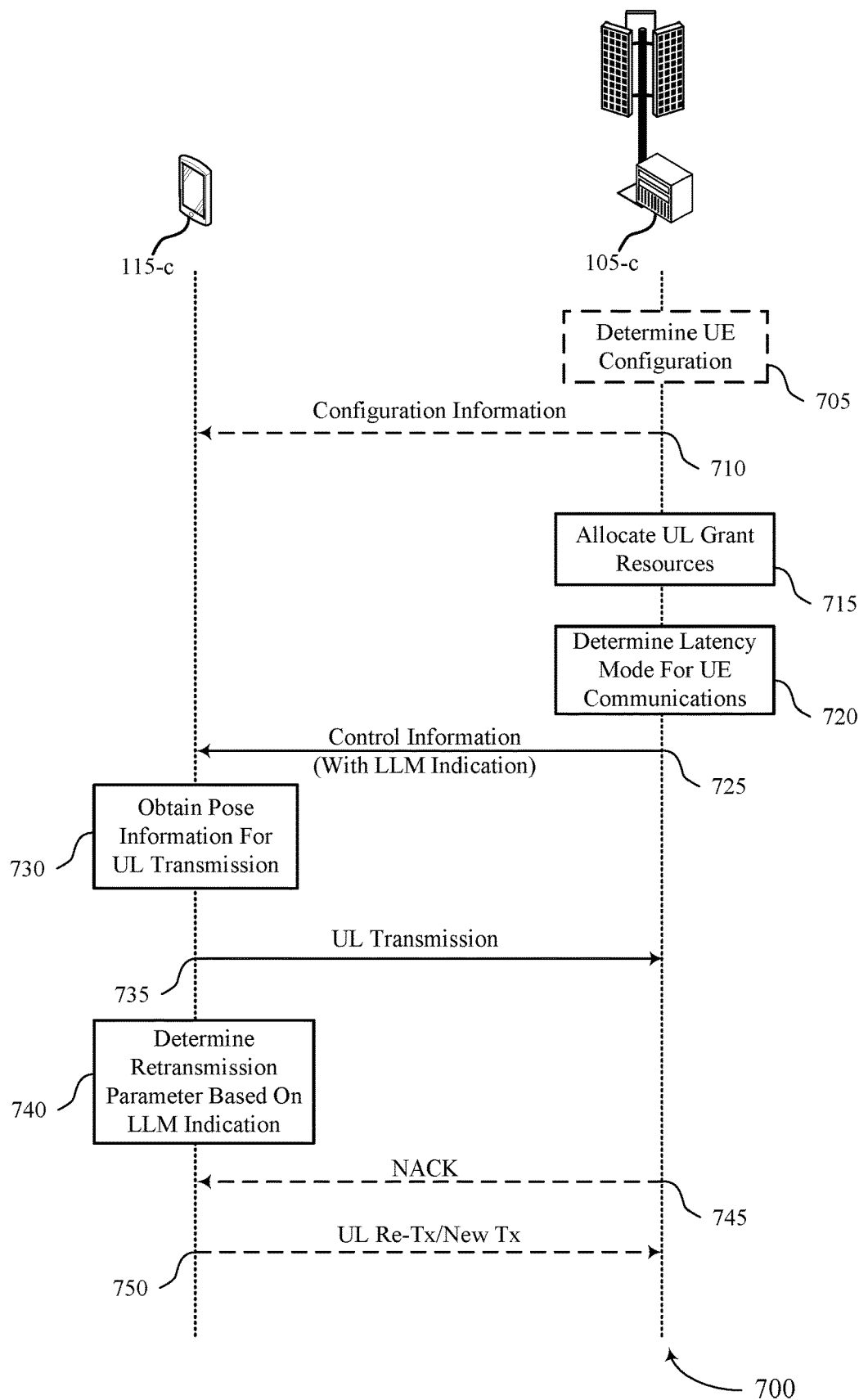
FIG. 7 illustrates an example of a process flow that supports low latency transmission techniques for uplink power saving in accordance with aspects of the present disclosure.

FIG. 7 illustrates an example of a process flow 700 that supports low latency transmission techniques for uplink power saving in accordance with aspects of the present disclosure. In some examples, process flow 700 may implement aspects of wireless communications system 100 and the wireless communications system 200 described with reference to FIGS. 1 and 2, respectively. The process flow 700 may be based on a configuration by a base station 105-c and implemented by a UE 115-c to promote power saving for the UE 115-c by selecting retransmission parameters based on a low latency mode indication. The process flow 700 may be implemented to promote high reliability and low latency communications (e.g., transmission of position information and control information of the UE 115-c for an XR application), among other benefits.

In the following description of the process flow 700, the operations between the base station 105-c and the UE 115-c may be transmitted in a different order than the example order shown, or the operations performed by the base station 105-c and the UE 115-c may be performed in different orders or at different times. Some operations may also be omitted from the process flow 700, and other operations may be added to the process flow 700. The base station 105-c and the UE 115-c may be examples of a base station 105 and a UE 115 as described herein.

At 705, the base station 105-b may optionally determine a configuration for the UE 115-c. The configuration may include multiple set of parameters, which may include one or more retransmission parameters for uplink data. At 710, the base station 105-c may transmit the configuration information to the UE 115-c. For example, the base station 105-c may transmit, via downlink signaling (e.g., RRC, MAC-CE, DCI), downlink parameters, uplink parameters, retransmission parameters, or combinations thereof, associated with low latency uplink data (e.g., XR data, to adapt a frame generation rate in an application layer associated with the UE 115-c). In some cases, multiple parameter lists/values may be pre-configured, and the base station 105-c may indicate which one to apply dynamically. In some cases, the configuration information may indicate that low latency data (e.g., XR pose information) transmissions may skip setting retransmission timers, in which case the UE 115-c may skip setting the retransmission timer and flush its uplink buffer after transmission of the low latency data. In some cases, the configuration information may indicate uplink resources and a periodicity of the resources that have no retransmissions and the UE 115-c may disable one or more associated retransmission timers.

At 715, the base station 105-c may allocate an uplink grant of resources to the UE 115-c. Such an uplink grant may provide for uplink communication of, for example, pose information from the UE to an XR server that is in communication with the base station 105-c. At 720, the base station 105-c may determine a latency mode for UE communications. In some cases, the latency mode may be enabled based on resource allocations to the UE 115-c being provided for an XR application. At 725, the base station 105-c may transmit DCI to the UE 115-c that indicates the latency mode configured for the UE 115-c. In some cases, a field may be defined in the DCI that includes a bit or flag that indicates whether low latency mode is enabled. As discussed herein, such a low latency mode indication may signal that the UE 115-c is to perform retransmissions in accordance with a configured low latency mode (e.g. no retransmissions, modified retransmission timeline, whether a new pose information may be transmitted in response to a NACK indication, etc.).

At 730, the UE 115-c may obtain pose information for a uplink transmission. At 735, the UE 115-c may transmit the pose information to the base station 105-c. At 740, the UE 115-c may set one or more retransmission parameters associated with the uplink transmission based on the latency mode indication that is indicated in the DCI. Such retransmission parameters may be determined in accordance with techniques as discussed herein.

Optionally, at 745, the base station 105-c may transmit a NACK indication to the UE 115-c. Such a NACK indication may be transmitted based on the base station 105-*c* having a failure in decoding of the uplink transmission. In some cases, the UE 115-*c* may not monitor for such a NACK indication (e.g., if the retransmission parameter disabled retransmissions for the low latency uplink communications). In other cases, the UE 115-*c* may perform retransmissions based on one or more modified timelines or timers that apply to low latency mode communications and are different than for non-low-latency mode communications. At 750, the UE 115-*c* may optionally transmit a retransmission of the pose information to the base station 105-*c*. In some cases, if the UE 115-*c* has obtained new pose information since the prior uplink communication, the new pose information may be transmitted to the base station 105-*c* as discussed herein, in order to avoid retransmission of stale pose information.

Figure 8:
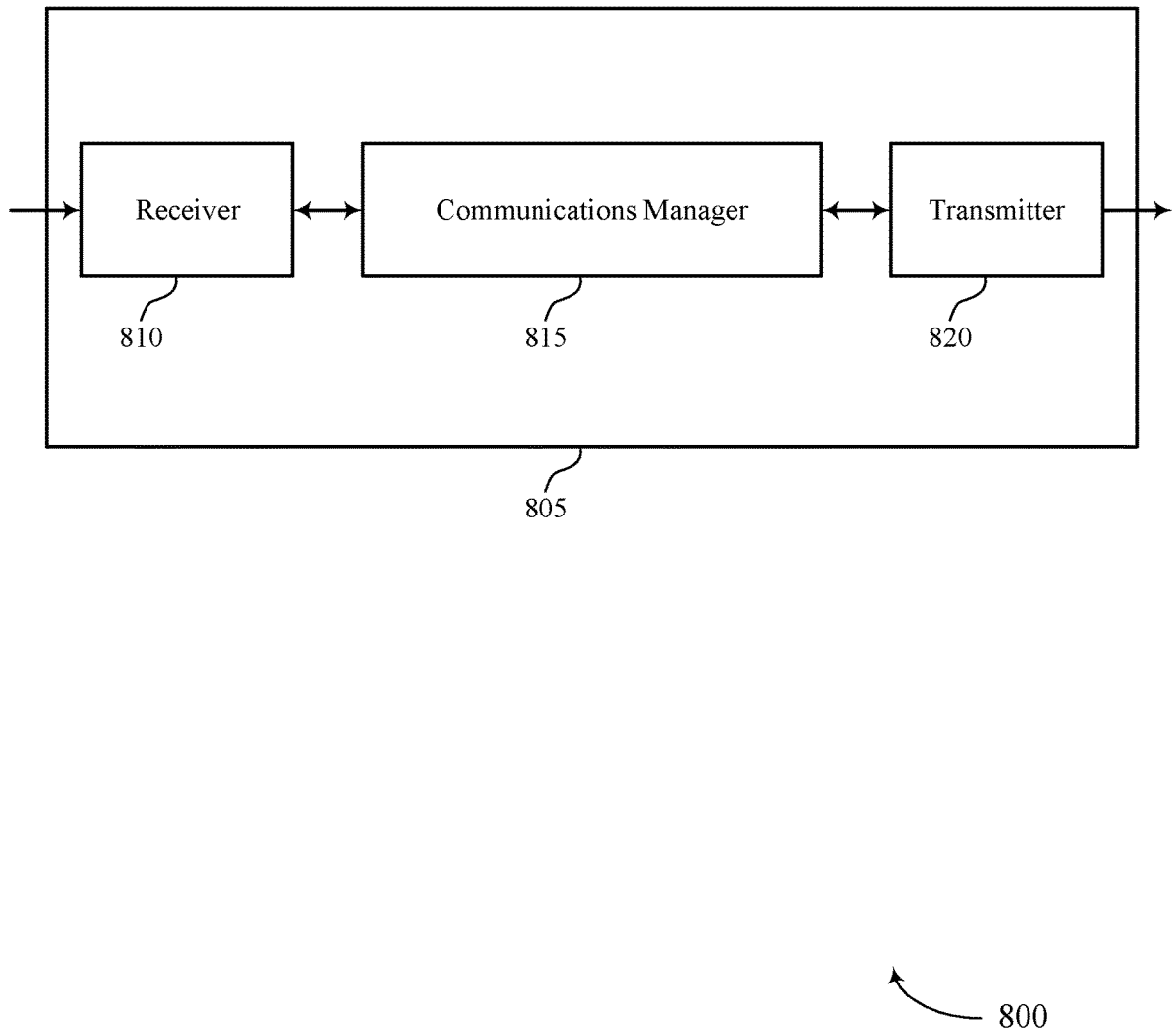
FIGS. 8 and 9 show block diagrams of devices that support low latency transmission techniques for uplink power saving in accordance with aspects of the present disclosure.

FIG. 8 shows a block diagram 800 of a device 805 that supports low latency transmission techniques for uplink power saving in accordance with aspects of the present disclosure. The device 805 may be an example of aspects of a UE 115 as described herein. The device 805 may include a receiver 810, a communications manager 815 (which may be an example of a processing system), and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to low latency transmission techniques for uplink power saving, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may obtain (e.g., via receiver 810), control information that indicates uplink resources for at least a first uplink communication from the UE to a base station and a latency indication that indicates that the first uplink communication has a latency equal to or below a latency threshold value, output (e.g., to transmitter 820) at least the first uplink communication for transmission to the base station using the uplink resources, and set a retransmission parameter associated with the first uplink communication based on the latency indication. The communications manager 815 may be an example of aspects of the communications manager 1110 described herein.

The communications manager 815, or its sub-components, may be implemented in hardware, code (e.g., software or firmware stored in memory) executed by at least one processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
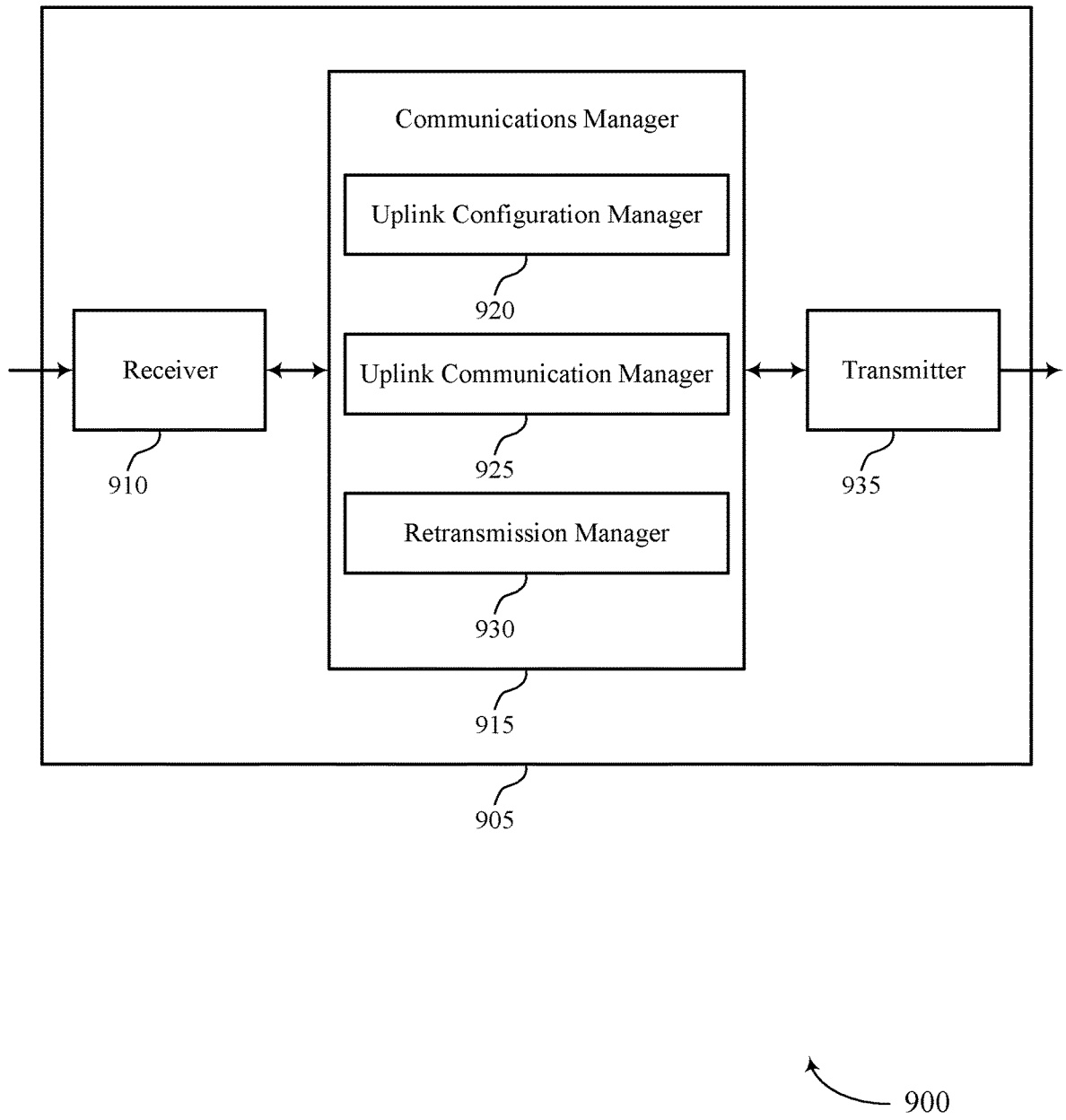

FIG. 9 shows a block diagram 900 of a device 905 that supports low latency transmission techniques for uplink power saving in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to low latency transmission techniques for uplink power saving, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an uplink configuration manager 920, an uplink communication manager 925, and a retransmission manager 930. The communications manager 915 may be an example of aspects of the communications manager 1110 described herein.

The uplink configuration manager 920 may obtain (e.g., via receiver 910 from a base station), control information that indicates uplink resources for at least a first uplink communication from the UE to the base station and a latency indication that indicates that the first uplink communication has a latency equal to or below a latency threshold value.

The uplink communication manager 925 may transmit at least the first uplink communication to the base station using the uplink resources (e.g., by outputting the first uplink communication to the transmitter 935).

The retransmission manager 930 may set a retransmission parameter associated with the first uplink communication based on the latency indication.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
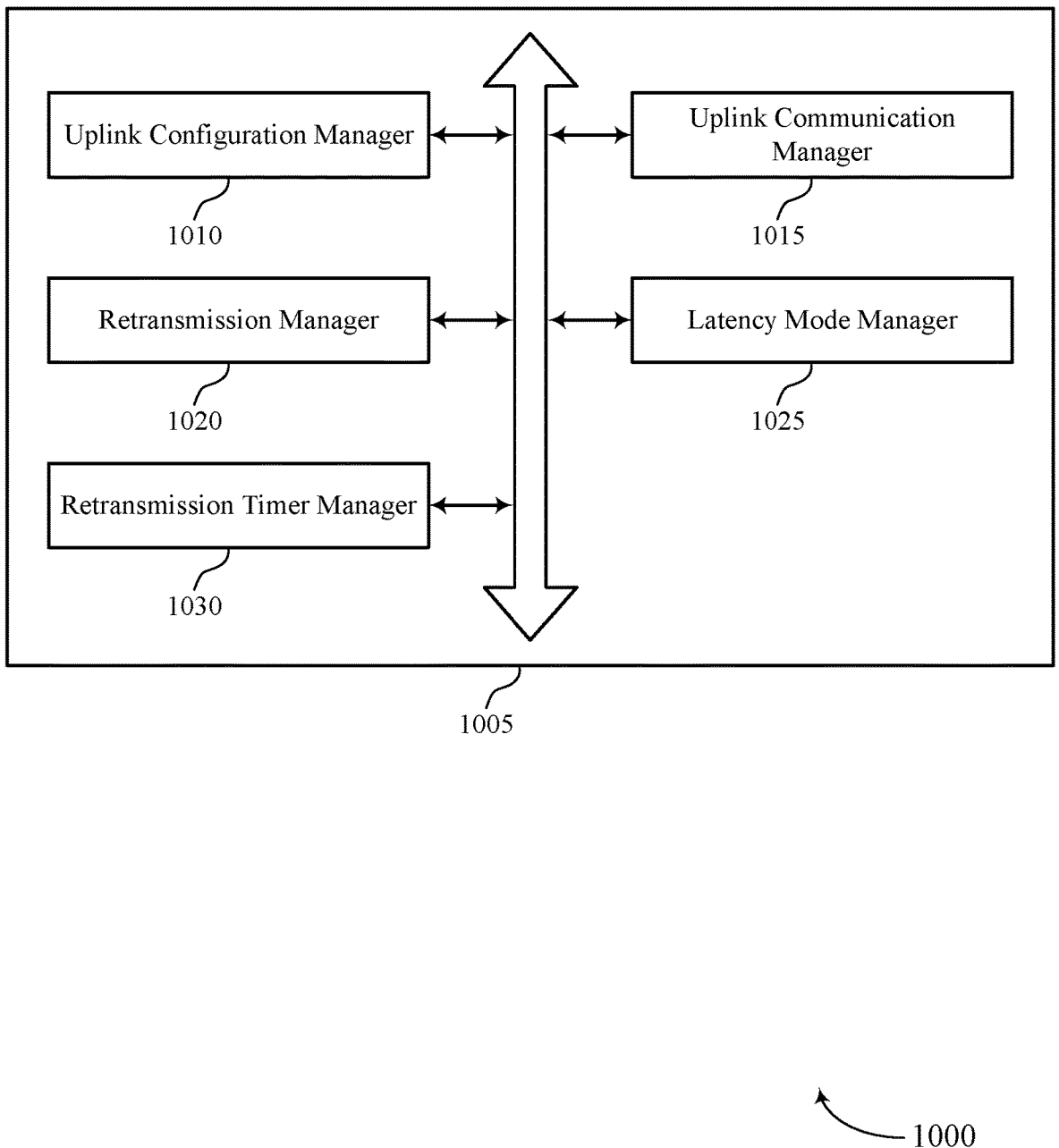
FIG. 10 shows a block diagram of a communications manager that supports low latency transmission techniques for uplink power saving in accordance with aspects of the present disclosure.

FIG. 10 shows a block diagram 1000 of a communications manager 1005 that supports low latency transmission techniques for uplink power saving in accordance with aspects of the present disclosure. The communications manager 1005 may be an example of aspects of a communications manager 815, a communications manager 915, or a communications manager 1110 described herein. The communications manager 1005 may include an uplink configuration manager 1010, an uplink communication manager 1015, a retransmission manager 1020, a latency mode manager 1025, and a retransmission timer manager 1030. Each of these modules may communicate, directly or indirectly, with one another (e.g., via one or more buses).

The uplink configuration manager 1010 may obtain (e.g., from a receiver) control information that indicates uplink resources for at least a first uplink communication from the UE to a base station and a latency indication that indicates that the first uplink communication has a latency equal to or below a latency threshold value. In some cases, the control information includes one or more parameters that are set to increase decoding probability of the first uplink communication. In some cases, the one or more parameters include one or more of a modulation and coding scheme parameter, a repetition parameter for transmitting multiple instances of the first uplink communication, a coding rate parameter, a transmit power boosting parameter, or any combinations thereof.

The uplink communication manager 1015 may output, for transmission to the base station using the uplink resources, at least the first uplink communication. In some cases, the uplink communication manager 1015 may select one or more transmission parameters of the second uplink communication to provide increased reliability of the second uplink communication.

In some examples, the uplink communication manager 1015 may identify that first uplink information included in the first uplink communication is stale. In some examples, the uplink communication manager 1015 may output the second uplink communication based on the identifying, where the second uplink communication includes second uplink information that is more recent than the first uplink information. In some cases, the first uplink information and the second uplink information include pose information, and where the second uplink information provides more recent pose information than the first uplink information. In some cases, the second uplink information provides for a reduced motion-to-render-to-photon (M2R2P) delay relative to a M2R2P delay associated with the first uplink information.

The retransmission manager 1020 may set a retransmission parameter associated with the first uplink communication based on the latency indication. In some examples, the retransmission manager 1020 may disable retransmissions of the first uplink communication based on the latency indication. In some cases, the retransmission manager 1020 may output a set of repetitions of the first uplink communication, detect an end-of-burst indication or a feedback inactivity timer expiration associated with the first uplink communication, and discontinue the set of repetitions based on the end-of-burst indication or the feedback inactivity timer expiration.

In some examples, the retransmission manager 1020 may obtain a feedback communication from the base station that indicates the first uplink communication was not successfully decoded and that either the first uplink communication is to be retransmitted or a second uplink communication is to be transmitted.

The latency mode manager 1025 may empty an uplink buffer associated with the first uplink communication after transmitting the first uplink communication. In some cases, the latency indication includes a low latency mode flag that indicates whether the first uplink communication is to use a low latency communication mode that has different retransmission parameters than other communication modes.

The retransmission timer manager 1030 may disable one or more feedback retransmission timers associated with the first uplink communication. In some examples, the retransmission timer manager 1030 may set, based on the latency indication, a feedback timer value associated with the first uplink communication. In some examples, the retransmission timer manager 1030 may receive, from the base station, radio resource control signaling that includes a first timer value and a second timer value, and where the feedback timer value is set by selecting one of the first timer value and the second timer value based on the latency indication.

In some examples, the retransmission timer manager 1030 may set a feedback timer associated with the first uplink communication based on the latency indication. In some cases, the first timer value provides a shorter time for retransmission of a first type of uplink communications (e.g., that include pose information for an extended reality application) than for other types of uplink communications.

In some cases, the feedback timer is set based on one or more downlink communications received from the base station. In some cases, the feedback timer is selected from a retransmission timer or an inactivity timer associated with one or more feedback processes at the UE based on which of the retransmission timer or the inactivity timer has a shorter time duration for the first uplink communication.

Figure 11:
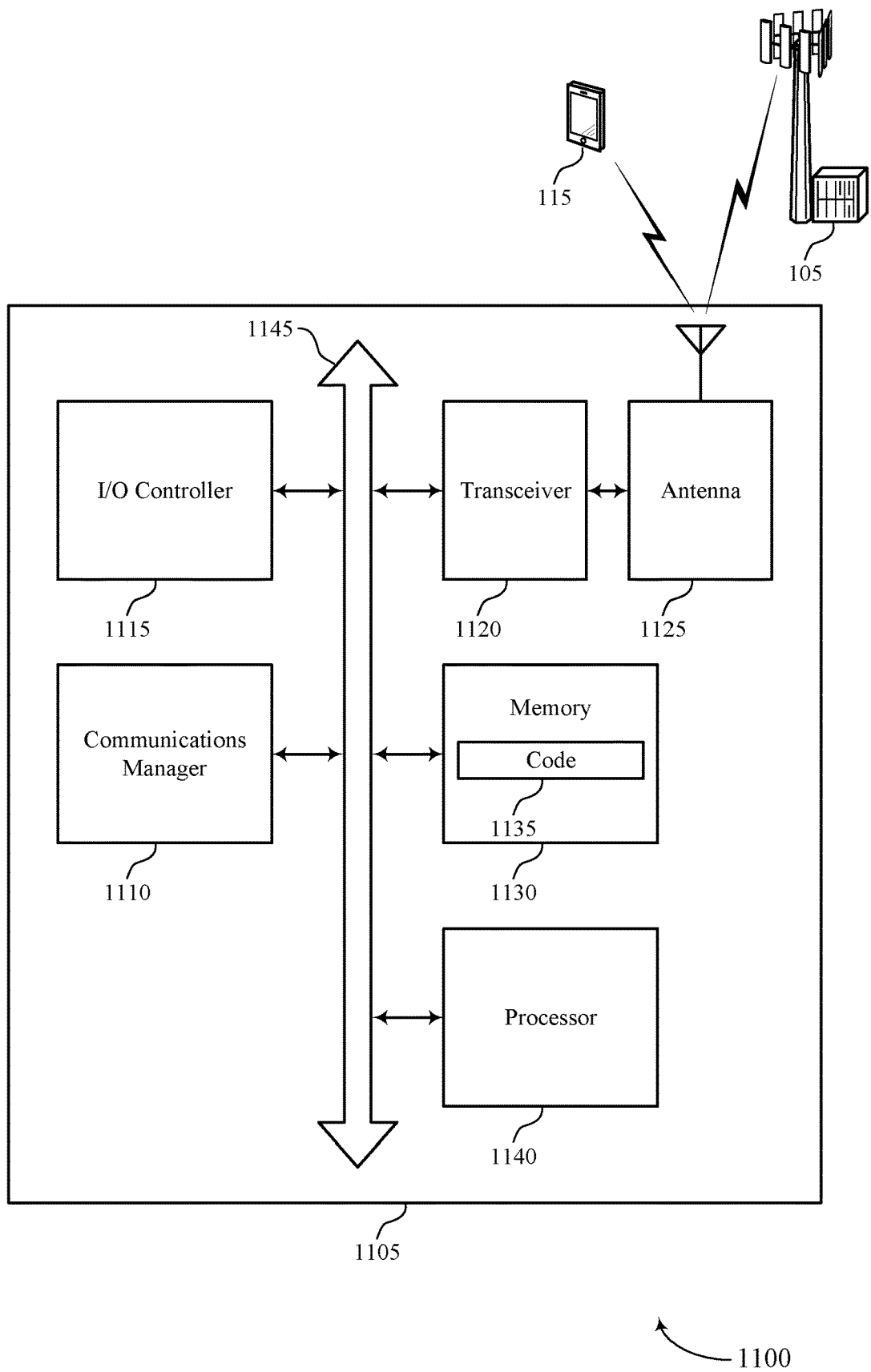
FIG. 11 shows a diagram of a system including a device that supports low latency transmission techniques for uplink power saving in accordance with aspects of the present disclosure.

FIG. 11 shows a diagram of a system 1100 including a device 1105 that supports low latency transmission techniques for uplink power saving in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive (e.g., via transceiver 1120), from a base station, control information that indicates uplink resources for at least a first uplink communication from the UE to the base station and a latency indication that indicates that the first uplink communication has a latency equal to or below a latency threshold value, transmit at least the first uplink communication to the base station (e.g., via transceiver 1120) using the uplink resources, and set a retransmission parameter associated with the first uplink communication based on the latency indication.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting low latency transmission techniques for uplink power saving).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
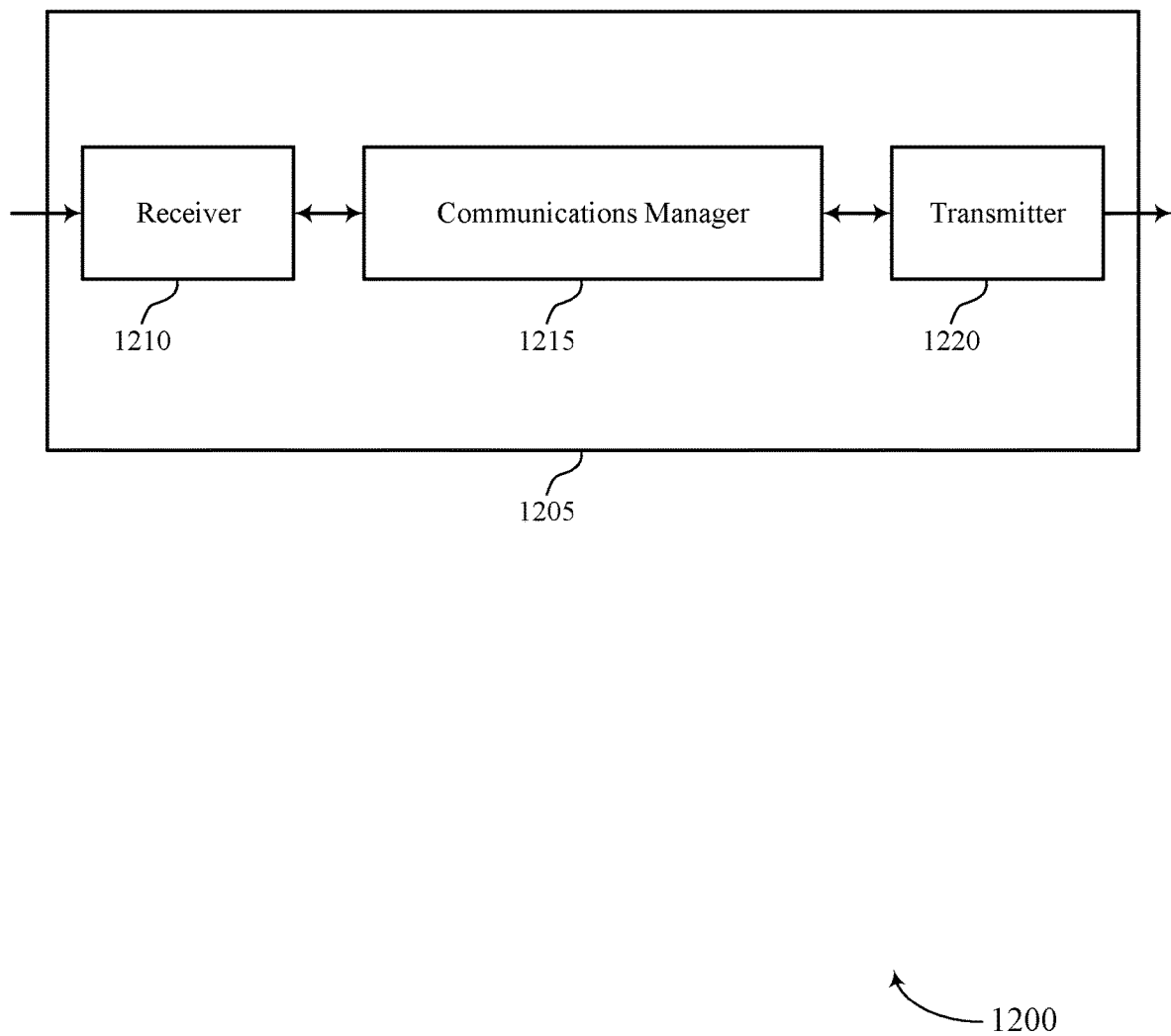
FIGS. 12 and 13 show block diagrams of devices that support low latency transmission techniques for uplink power saving in accordance with aspects of the present disclosure.

FIG. 12 shows a block diagram 1200 of a device 1205 that supports low latency transmission techniques for uplink power saving in accordance with aspects of the present disclosure. The device 1205 may be an example of aspects of a base station 105 as described herein. The device 1205 may include a receiver 1210, a communications manager 1215 (which may be an example of a processing system), and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to low latency transmission techniques for uplink power saving, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may output (e.g., to transmitter 1220), for transmission to a UE, control information that indicates uplink resources for at least a first uplink communication from the UE to the base station and a latency indication that indicates that the first uplink communication has a latency equal to or below a latency threshold value, obtain, from the UE, at least the first uplink communication, and set a retransmission parameter associated with the first uplink communication based on the latency indication. The communications manager 1215 may be an example of aspects of the communications manager 1510 described herein.

The communications manager 1215, or its sub-components, may be implemented in hardware, code (e.g., software or firmware stored in memory) executed by at least one processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
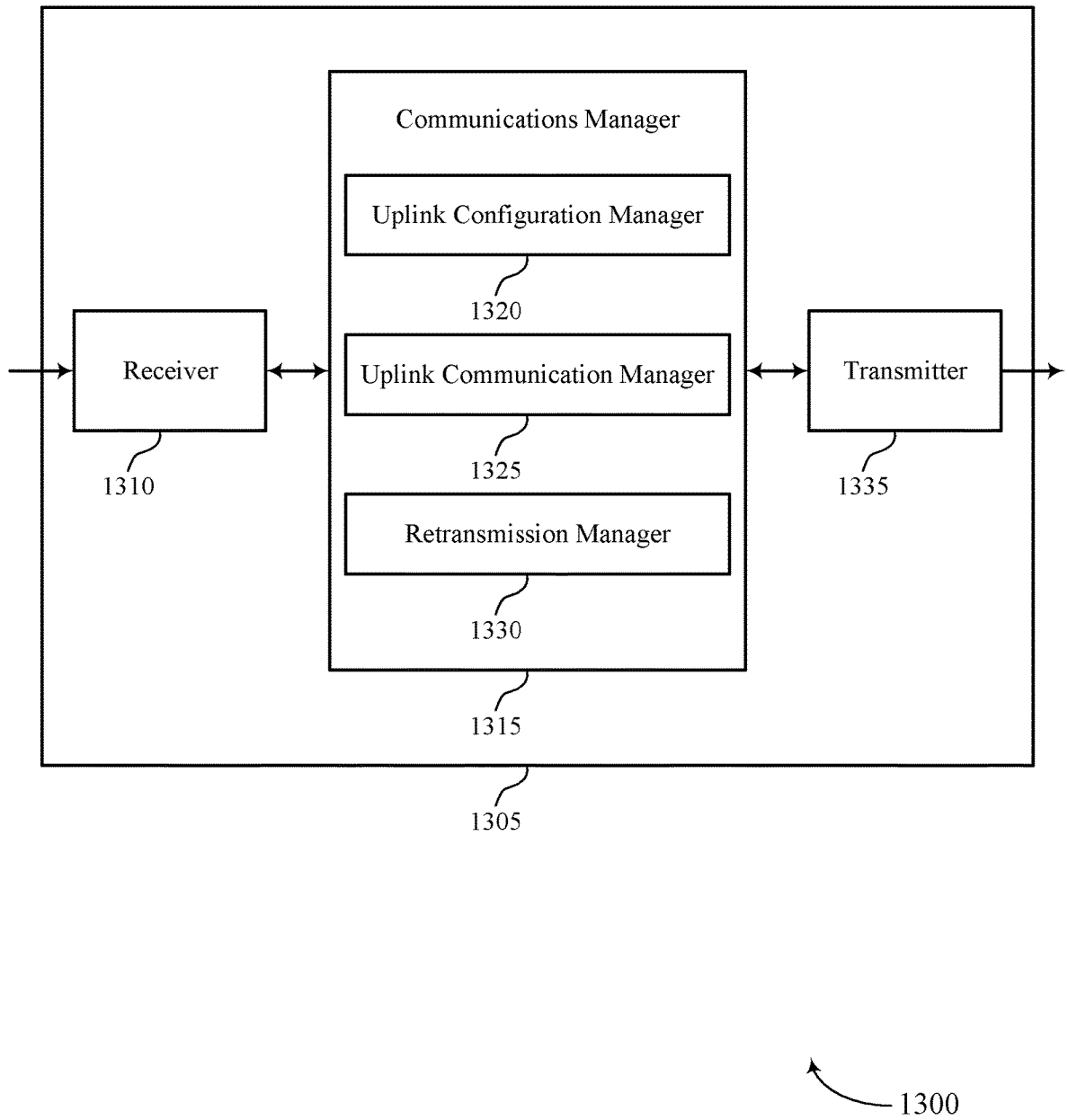

FIG. 13 shows a block diagram 1300 of a device 1305 that supports low latency transmission techniques for uplink power saving in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to low latency transmission techniques for uplink power saving, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include an uplink configuration manager 1320, an uplink communication manager 1325, and a retransmission manager 1330. The communications manager 1315 may be an example of aspects of the communications manager 1510 described herein.

The uplink configuration manager 1320 may transmit (e.g., by outputting to the transmitter 1335), to a UE, control information that indicates uplink resources for at least a first uplink communication from the UE to the base station and a latency indication that indicates that the first uplink communication has a latency equal to or below a latency threshold value.

The uplink communication manager 1325 may receive, from the UE (e.g., via receiver 1310), at least the first uplink communication.

The retransmission manager 1330 may set a retransmission parameter associated with the first uplink communication based on the latency indication.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
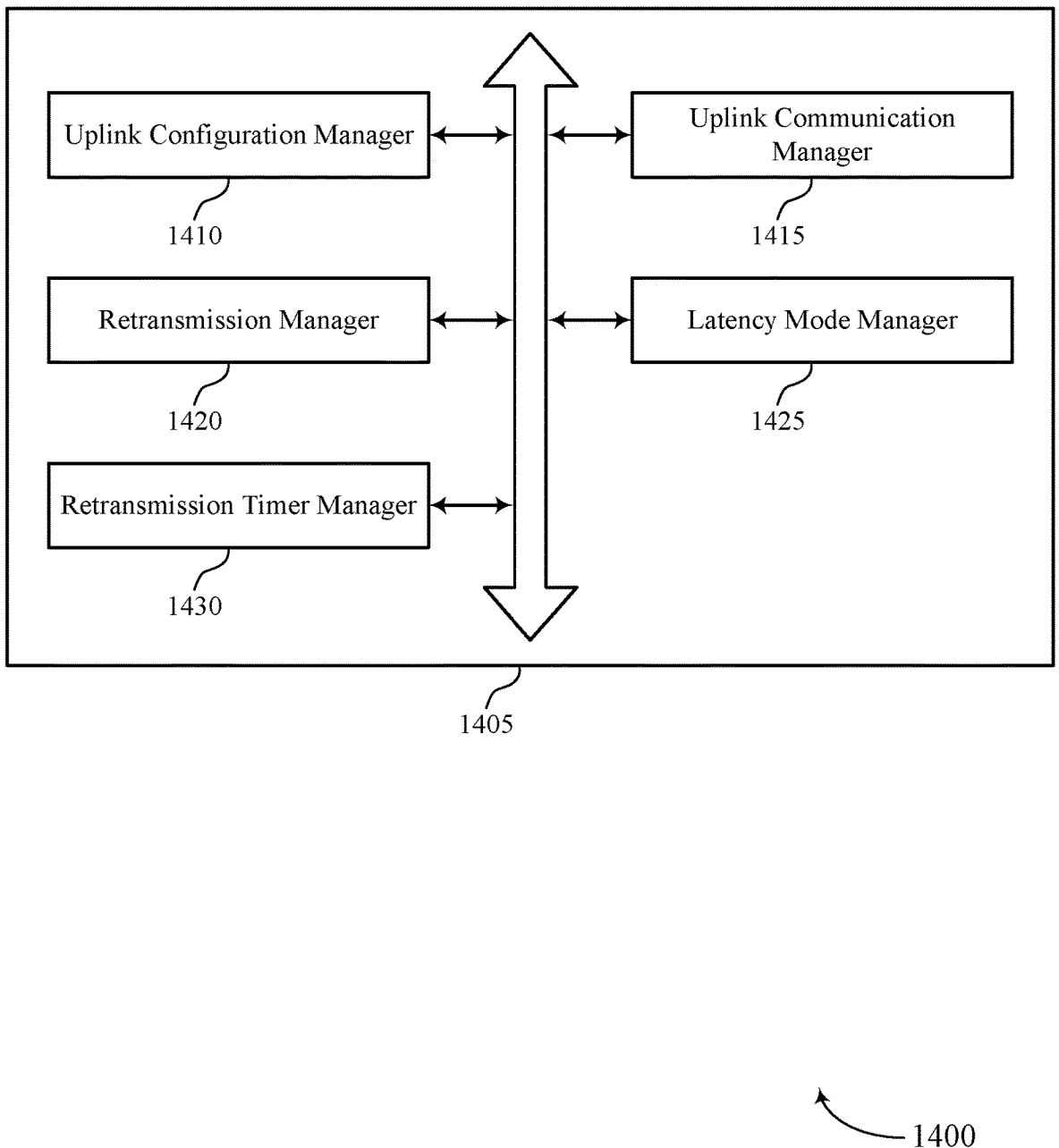
FIG. 14 shows a block diagram of a communications manager that supports low latency transmission techniques for uplink power saving in accordance with aspects of the present disclosure.

FIG. 14 shows a block diagram 1400 of a communications manager 1405 that supports low latency transmission techniques for uplink power saving in accordance with aspects of the present disclosure. The communications manager 1405 may be an example of aspects of a communications manager 1215, a communications manager 1315, or a communications manager 1510 described herein. The communications manager 1405 may include an uplink configuration manager 1410, an uplink communication manager 1415, a retransmission manager 1420, a latency mode manager 1425, and a retransmission timer manager 1430. Each of these modules may communicate, directly or indirectly, with one another (e.g., via one or more buses).

The uplink configuration manager 1410 may output, for transmission to a UE, control information that indicates uplink resources for at least a first uplink communication from the UE to the base station and a latency indication that indicates that the first uplink communication has a latency equal to or below a latency threshold value.

In some cases, the uplink configuration manager 1410 may select one or more transmission parameters of the second uplink communication to provide increased reliability of the second uplink communication. In some cases, the control information includes one or more parameters that are set to increase decoding probability of the first uplink communication. In some cases, the one or more parameters include one or more of a modulation and coding scheme parameter, a repetition parameter for transmitting multiple instances of the first uplink communication, a coding rate parameter, a transmit power boosting parameter, or any combinations thereof.

The uplink communication manager 1415 may obtain, from the UE, at least the first uplink communication.

In some examples, the uplink communication manager 1415 may obtain the second uplink communication responsive to the feedback communication, where the second uplink communication includes second uplink information that is more recent than first uplink information transmitted in the first uplink communication. In some cases, the first uplink information and the second uplink information include pose information, and where the second uplink information provides more recent pose information than the first uplink information. In some cases, the second uplink information provides for a reduced motion-to-render-to-photon (M2R2P) delay relative to a M2R2P delay associated with the first uplink information.

The retransmission manager 1420 may set a retransmission parameter associated with the first uplink communication based on the latency indication. In some examples, the retransmission manager 1420 may disable retransmissions of the first uplink communication based on the latency indication. In some examples, the retransmission manager 1420 may determine that the first uplink communication is not successfully decoded.

In some examples, the retransmission manager 1420 may output, for transmission to the UE, a feedback communication that indicates the first uplink communication was not successfully decoded and that either the first uplink communication is to be retransmitted or a second uplink communication is to be transmitted.

In some examples, the retransmission manager 1420 may configure the UE to transmit a set of repetitions of the first uplink communication and to discontinue transmission of the set of repetitions based on detection of an end-of-burst indication or feedback inactivity timer expiration.

The latency mode manager 1425 may disable one or more feedback processes associated with the first uplink communication. In some cases, the latency indication includes a low latency mode flag that indicates whether the first uplink communication is to use a low latency communication mode that has different retransmission parameters than other communication modes.

The retransmission timer manager 1430 may determine, based on the latency indication, a feedback timer value associated with the first uplink communication. In some examples, the retransmission timer manager 1430 may transmit, to the UE, radio resource control signaling that includes a first timer value and a second timer value, and where the feedback timer value is set by selecting one of the first timer value and the second timer value based on the latency indication. In some examples, the retransmission timer manager 1430 may identify a feedback timer associated with the first uplink communication based on the latency indication.

In some cases, the first timer value provides a shorter time for providing feedback information for a first type of uplink communications that include pose information for an extended reality application than for other types of uplink communications. In some cases, the feedback timer is selected from a retransmission timer or an inactivity timer associated with one or more feedback processes at the UE based on which of the retransmission timer or the inactivity timer has a shorter time duration from the first uplink communication.

Figure 15:
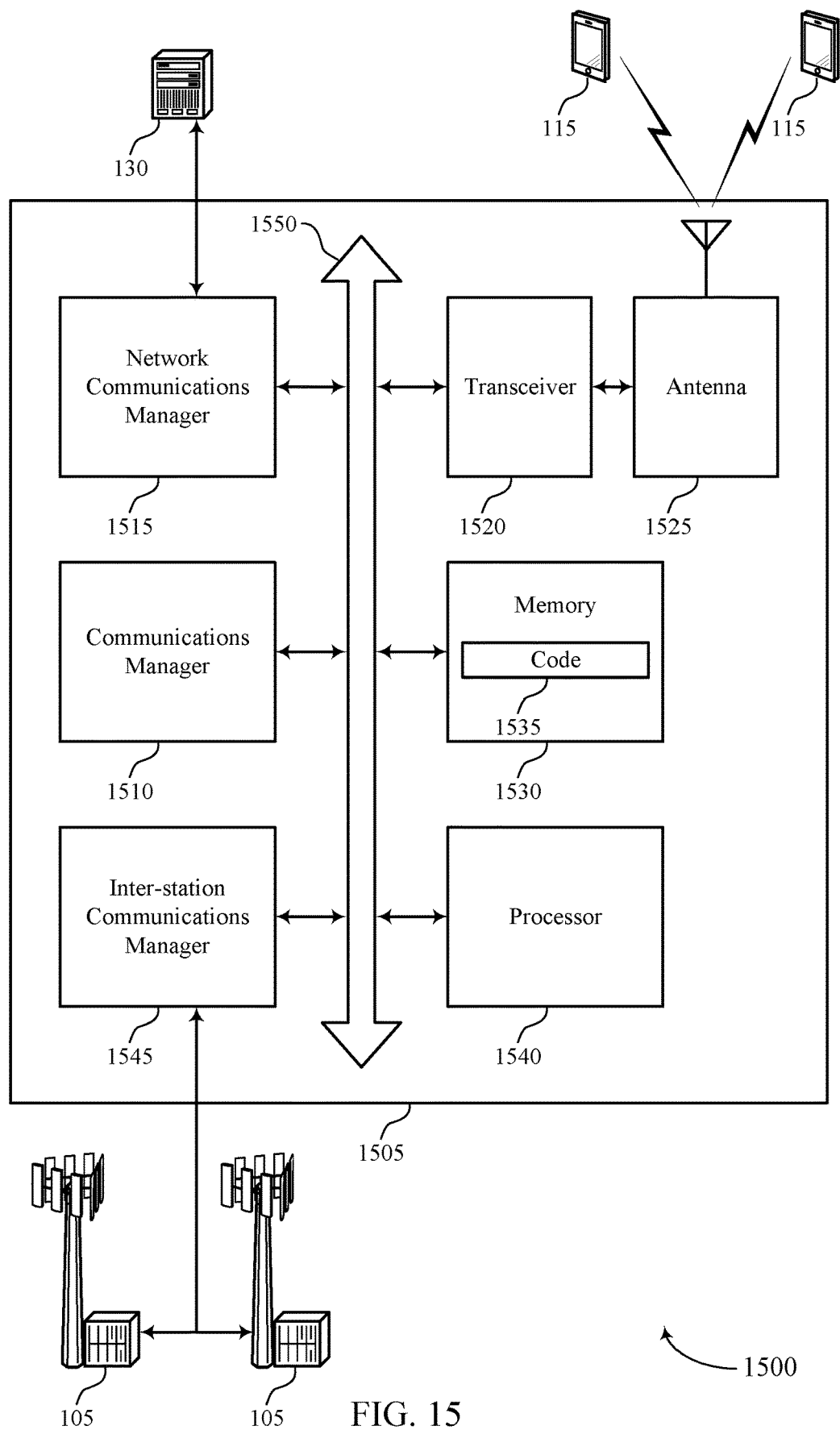
FIG. 15 shows a diagram of a system including a device that supports low latency transmission techniques for uplink power saving in accordance with aspects of the present disclosure.

FIG. 15 shows a diagram of a system 1500 including a device 1505 that supports low latency transmission techniques for uplink power saving in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may output (e.g., to transceiver 1520), for transmission to a UE, control information that indicates uplink resources for at least a first uplink communication from the UE to the base station and a latency indication that indicates that the first uplink communication has a latency equal to or below a latency threshold value, obtain, from the UE (e.g., via transceiver 1520), at least the first uplink communication, and set a retransmission parameter associated with the first uplink communication based on the latency indication.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting low latency transmission techniques for uplink power saving).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
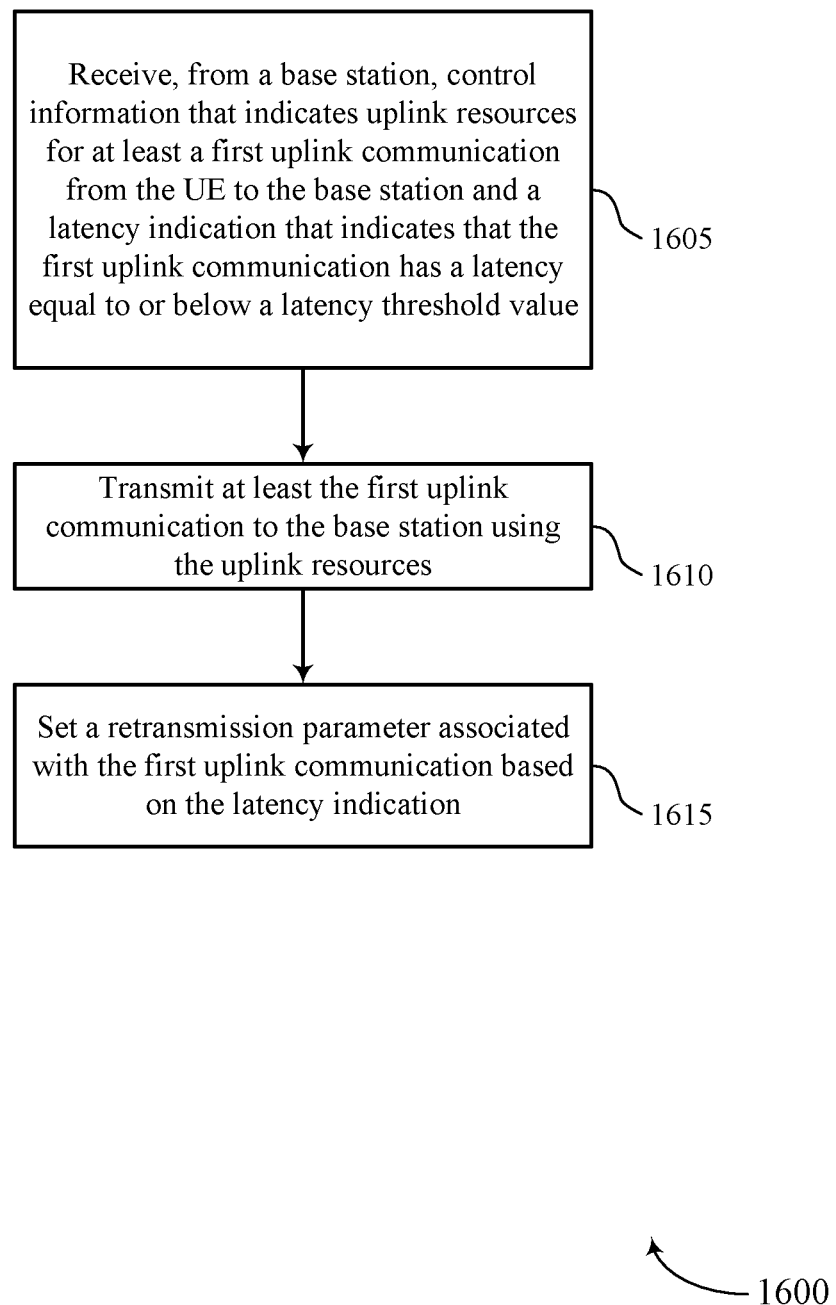
FIGS. 16 through 24 show flowcharts illustrating methods that support low latency transmission techniques for uplink power saving in accordance with aspects of the present disclosure.

FIG. 16 shows a flowchart illustrating a method 1600 that supports low latency transmission techniques for uplink power saving in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, control information that indicates uplink resources for at least a first uplink communication from the UE to the base station and a latency indication that indicates that the first uplink communication has a latency equal to or below a latency threshold value. The operations of 1605 may be performed according to the methods described herein. In some examples, aspects of the operations of 1605 may be performed by an uplink configuration manager as described with reference to FIGS. 8 through 11.

At 1610, the UE may transmit at least the first uplink communication to the base station using the uplink resources. The operations of 1610 may be performed according to the methods described herein. In some examples, aspects of the operations of 1610 may be performed by an uplink communication manager as described with reference to FIGS. 8 through 11.

At 1615, the UE may set a retransmission parameter associated with the first uplink communication based on the latency indication. The operations of 1615 may be performed according to the methods described herein. In some examples, aspects of the operations of 1615 may be performed by a retransmission manager as described with reference to FIGS. 8 through 11.

Figure 17:
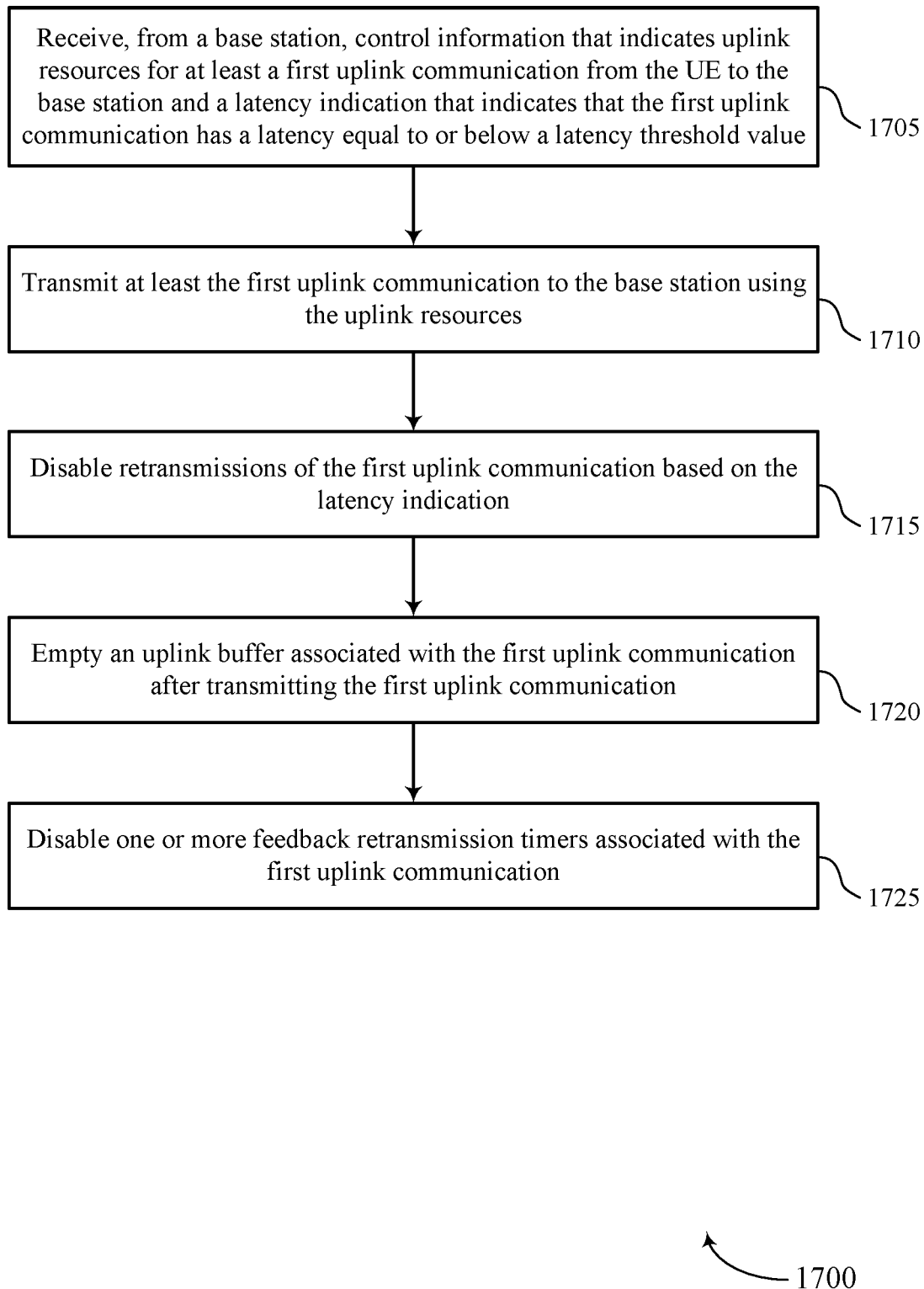

FIG. 17 shows a flowchart illustrating a method 1700 that supports low latency transmission techniques for uplink power saving in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, control information that indicates uplink resources for at least a first uplink communication from the UE to the base station and a latency indication that indicates that the first uplink communication has a latency equal to or below a latency threshold value. The operations of 1705 may be performed according to the methods described herein. In some examples, aspects of the operations of 1705 may be performed by an uplink configuration manager as described with reference to FIGS. 8 through 11.

At 1710, the UE may transmit at least the first uplink communication to the base station using the uplink resources. The operations of 1710 may be performed according to the methods described herein. In some examples, aspects of the operations of 1710 may be performed by an uplink communication manager as described with reference to FIGS. 8 through 11.

At 1715, the UE may disable retransmissions of the first uplink communication based on the latency indication. The operations of 1715 may be performed according to the methods described herein. In some examples, aspects of the operations of 1715 may be performed by a retransmission manager as described with reference to FIGS. 8 through 11.

At 1720, the UE may empty an uplink buffer associated with the first uplink communication after transmitting the first uplink communication. The operations of 1720 may be performed according to the methods described herein. In some examples, aspects of the operations of 1720 may be performed by a latency mode manager as described with reference to FIGS. 8 through 11.

At 1725, the UE may disable one or more feedback retransmission timers associated with the first uplink communication. The operations of 1725 may be performed according to the methods described herein. In some examples, aspects of the operations of 1725 may be performed by a retransmission timer manager as described with reference to FIGS. 8 through 11.

Figure 18:
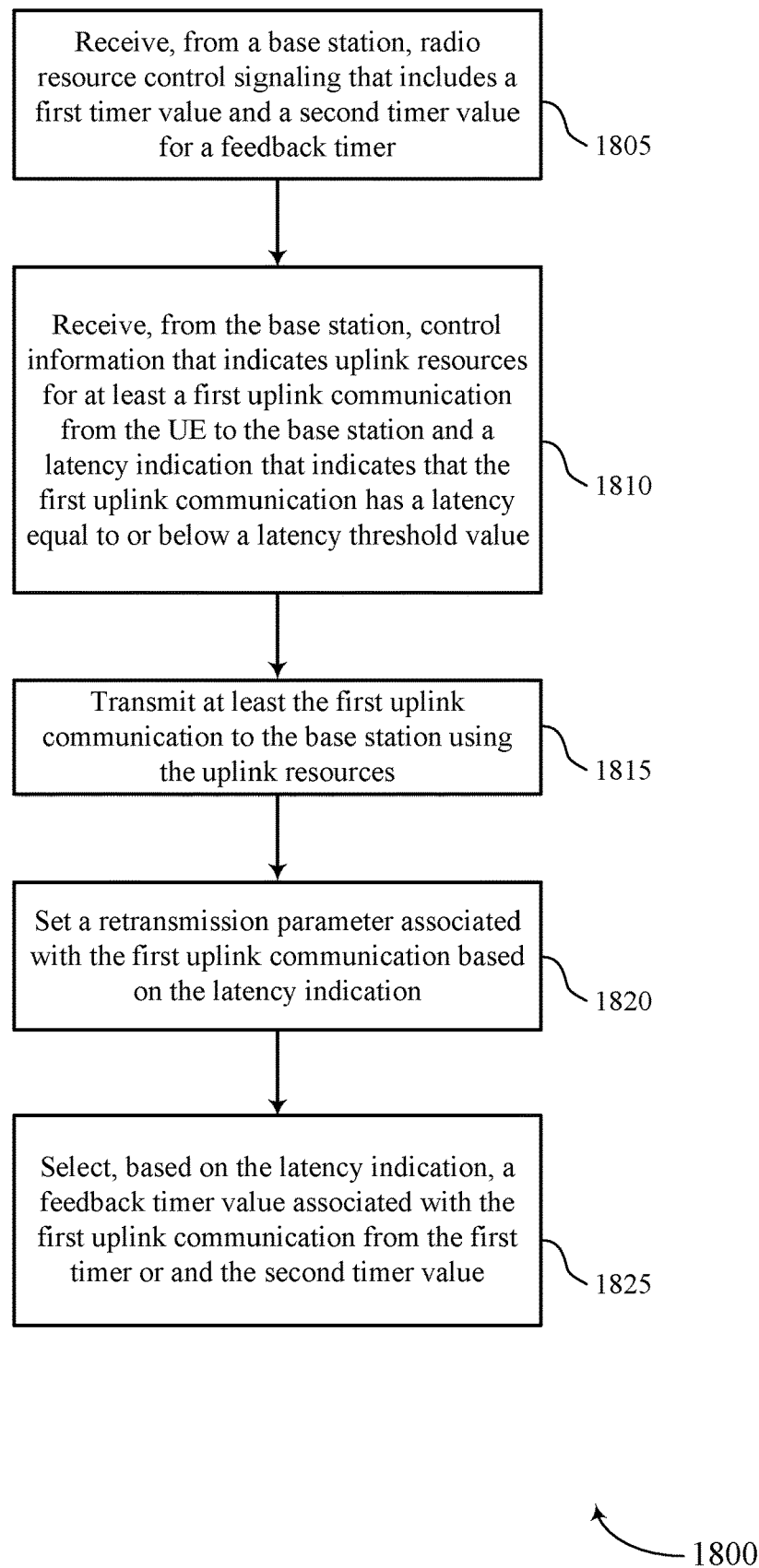

FIG. 18 shows a flowchart illustrating a method 1800 that supports low latency transmission techniques for uplink power saving in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, radio resource control signaling that includes a first timer value and a second timer value for a feedback timer. The operations of 1805 may be performed according to the methods described herein. In some examples, aspects of the operations of 1805 may be performed by a retransmission timer manager as described with reference to FIGS. 8 through 11.

At 1810, the UE may receive, from the base station, control information that indicates uplink resources for at least a first uplink communication from the UE to the base station and a latency indication that indicates that the first uplink communication has a latency equal to or below a latency threshold value. The operations of 1810 may be performed according to the methods described herein. In some examples, aspects of the operations of 1805 may be performed by an uplink configuration manager as described with reference to FIGS. 8 through 11.

At 1815, the UE may transmit at least the first uplink communication to the base station using the uplink resources. The operations of 1815 may be performed according to the methods described herein. In some examples, aspects of the operations of 1815 may be performed by an uplink communication manager as described with reference to FIGS. 8 through 11.

At 1820, the UE may set a retransmission parameter associated with the first uplink communication based on the latency indication. The operations of 1820 may be performed according to the methods described herein. In some examples, aspects of the operations of 1820 may be performed by a retransmission manager as described with reference to FIGS. 8 through 11.

At 1825, the UE may select, based on the latency indication, a feedback timer value associated with the first uplink communication from the first timer value or the second timer value. The operations of 1825 may be performed according to the methods described herein. In some examples, aspects of the operations of 1825 may be performed by a retransmission timer manager as described with reference to FIGS. 8 through 11.

Figure 19:
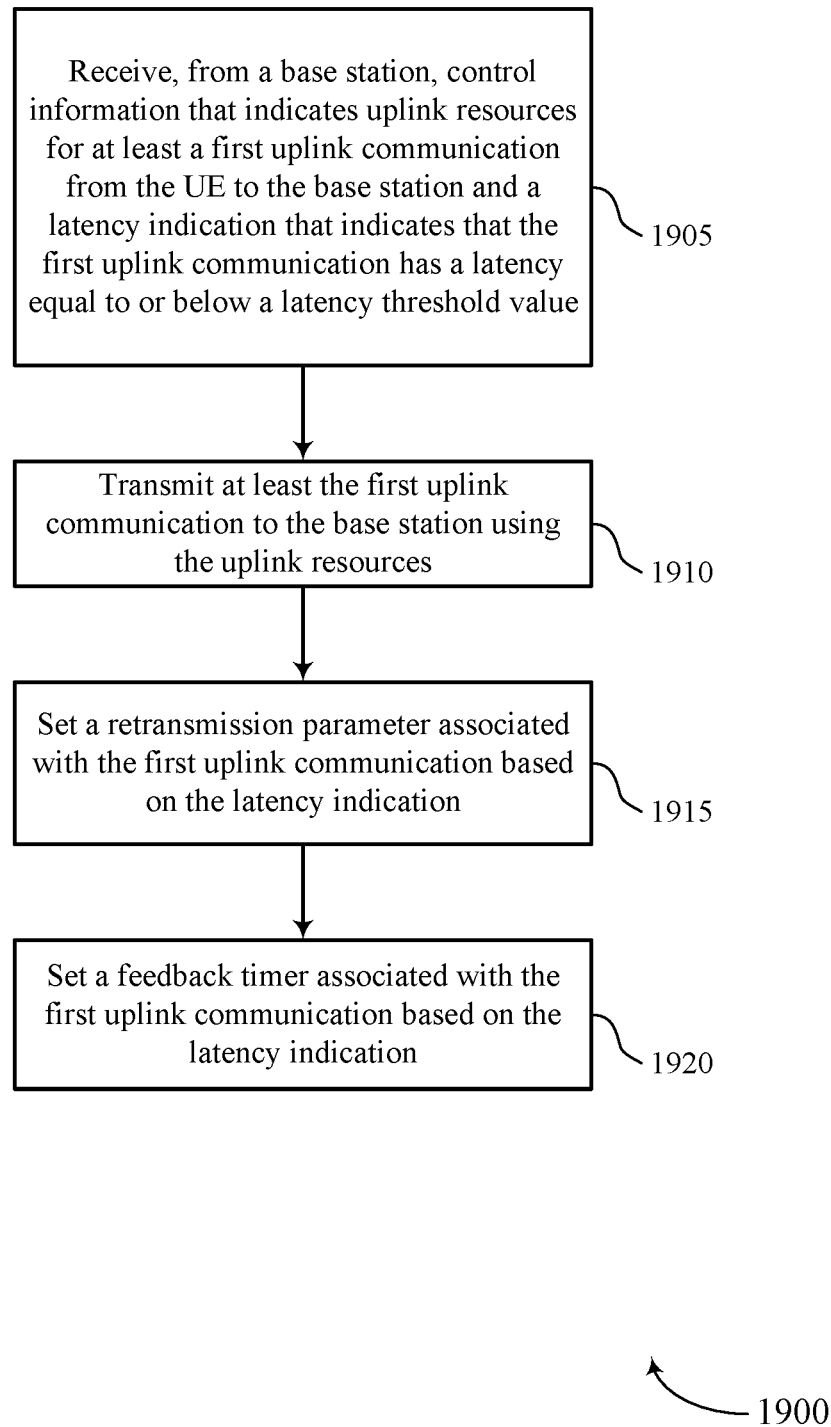

FIG. 19 shows a flowchart illustrating a method 1900 that supports low latency transmission techniques for uplink power saving in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, control information that indicates uplink resources for at least a first uplink communication from the UE to the base station and a latency indication that indicates that the first uplink communication has a latency equal to or below a latency threshold value. The operations of 1905 may be performed according to the methods described herein. In some examples, aspects of the operations of 1905 may be performed by an uplink configuration manager as described with reference to FIGS. 8 through 11.

At 1910, the UE may transmit at least the first uplink communication to the base station using the uplink resources. The operations of 1910 may be performed according to the methods described herein. In some examples, aspects of the operations of 1910 may be performed by an uplink communication manager as described with reference to FIGS. 8 through 11.

At 1915, the UE may set a retransmission parameter associated with the first uplink communication based on the latency indication. The operations of 1915 may be performed according to the methods described herein. In some examples, aspects of the operations of 1915 may be performed by a retransmission manager as described with reference to FIGS. 8 through 11.

At 1920, the UE may set a feedback timer associated with the first uplink communication based on the latency indication. The operations of 1920 may be performed according to the methods described herein. In some examples, aspects of the operations of 1920 may be performed by a retransmission timer manager as described with reference to FIGS. 8 through 11.

Figure 20:
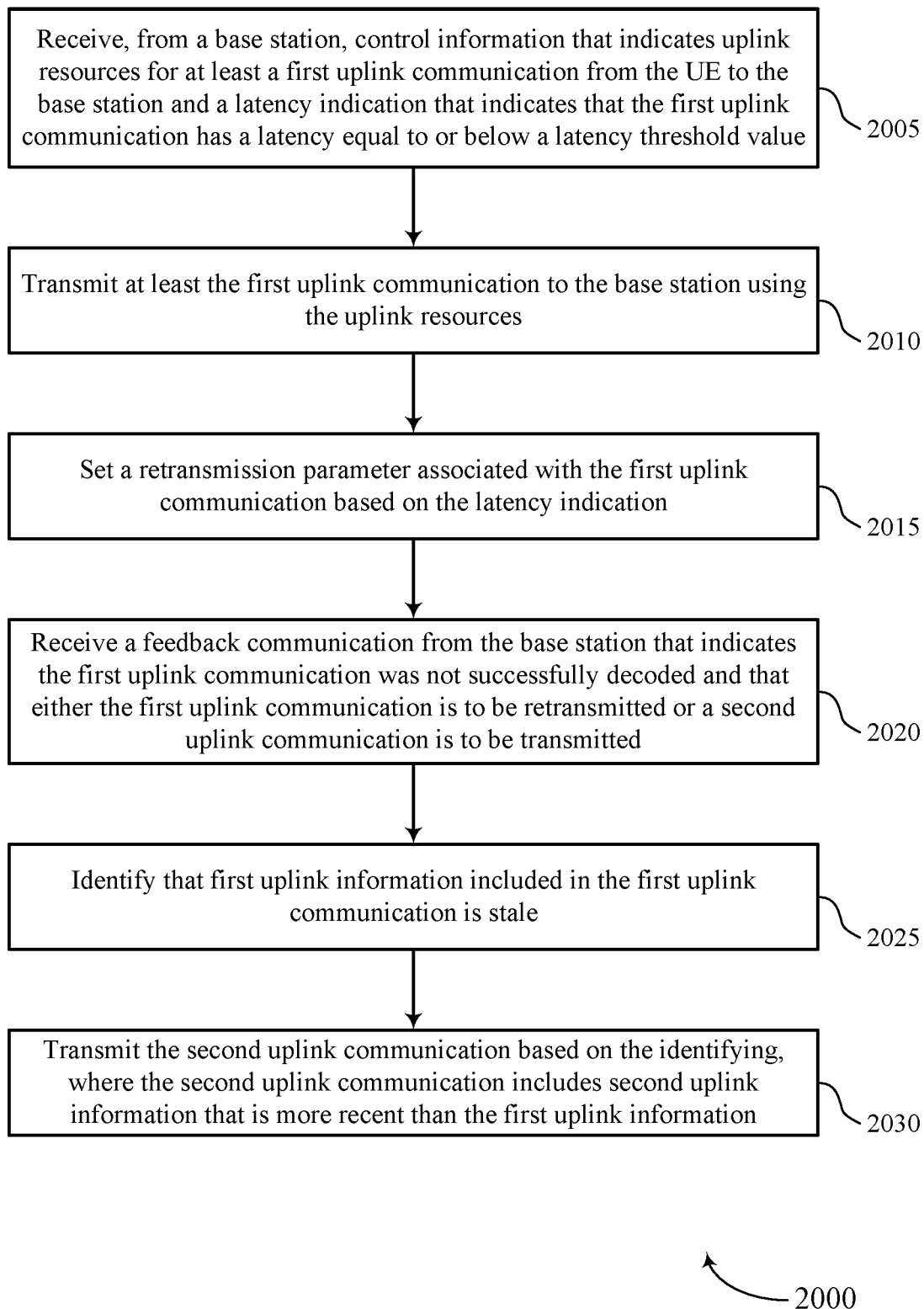

FIG. 20 shows a flowchart illustrating a method 2000 that supports low latency transmission techniques for uplink power saving in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, control information that indicates uplink resources for at least a first uplink communication from the UE to the base station and a latency indication that indicates that the first uplink communication has a latency equal to or below a latency threshold value. The operations of 2005 may be performed according to the methods described herein. In some examples, aspects of the operations of 2005 may be performed by an uplink configuration manager as described with reference to FIGS. 8 through 11.

At 2010, the UE may transmit at least the first uplink communication to the base station using the uplink resources. The operations of 2010 may be performed according to the methods described herein. In some examples, aspects of the operations of 2010 may be performed by an uplink communication manager as described with reference to FIGS. 8 through 11.

At 2015, the UE may set a retransmission parameter associated with the first uplink communication based on the latency indication. The operations of 2015 may be performed according to the methods described herein. In some examples, aspects of the operations of 2015 may be performed by a retransmission manager as described with reference to FIGS. 8 through 11.

At 2020, the UE may receive a feedback communication from the base station that indicates the first uplink communication was not successfully decoded and that either the first uplink communication is to be retransmitted or a second uplink communication is to be transmitted. The operations of 2020 may be performed according to the methods described herein. In some examples, aspects of the operations of 2020 may be performed by a retransmission manager as described with reference to FIGS. 8 through 11.

At 2025, the UE may identify that first uplink information included in the first uplink communication is stale. The operations of 2025 may be performed according to the methods described herein. In some examples, aspects of the operations of 2025 may be performed by an uplink communication manager as described with reference to FIGS. 8 through 11.

At 2030, the UE may transmit the second uplink communication based on the identifying, where the second uplink communication includes second uplink information that is more recent than the first uplink information. The operations of 2030 may be performed according to the methods described herein. In some examples, aspects of the operations of 2030 may be performed by an uplink communication manager as described with reference to FIGS. 8 through 11.

Figure 21:
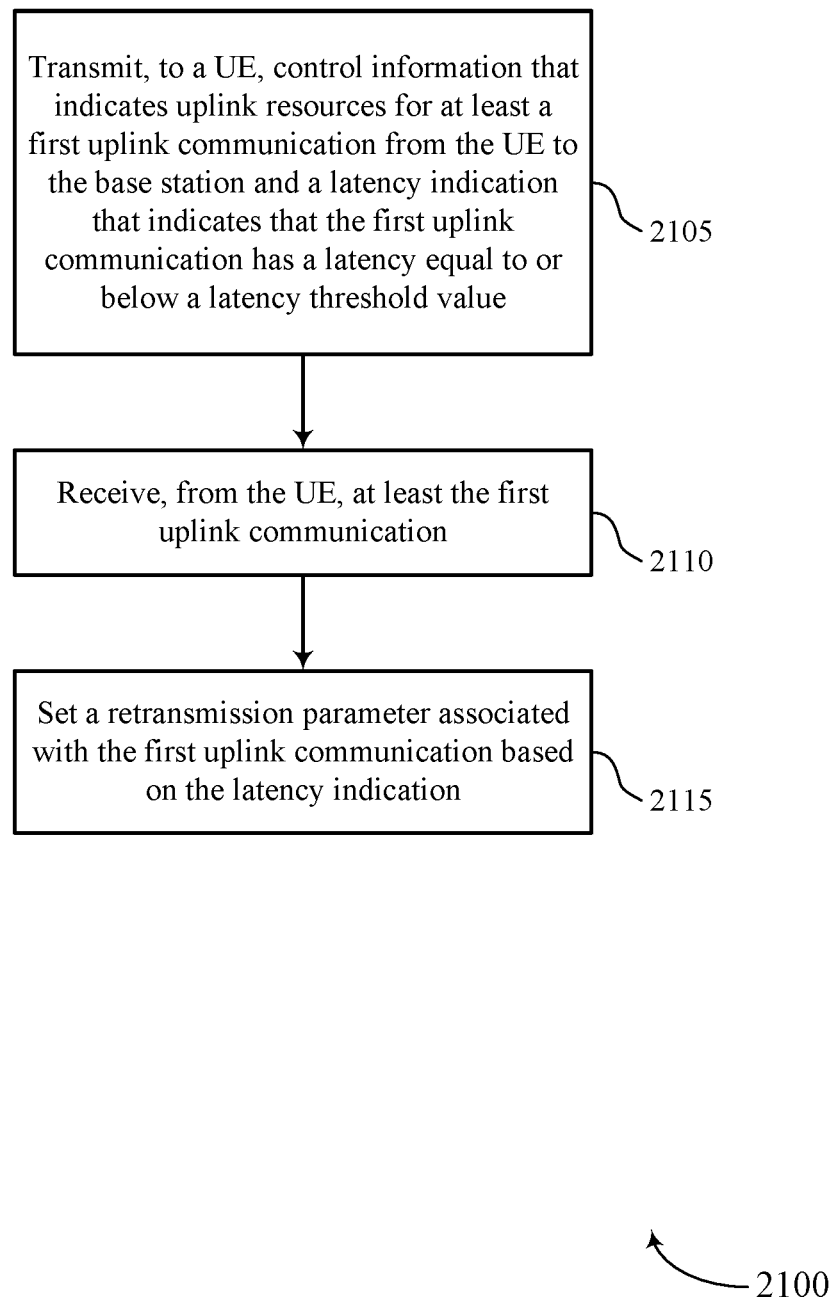

FIG. 21 shows a flowchart illustrating a method 2100 that supports low latency transmission techniques for uplink power saving in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, control information that indicates uplink resources for at least a first uplink communication from the UE to the base station and a latency indication that indicates that the first uplink communication has a latency equal to or below a latency threshold value. The operations of 2105 may be performed according to the methods described herein. In some examples, aspects of the operations of 2105 may be performed by an uplink configuration manager as described with reference to FIGS. 12 through 15.

At 2110, the base station may receive, from the UE, at least the first uplink communication. The operations of 2110 may be performed according to the methods described herein. In some examples, aspects of the operations of 2110 may be performed by an uplink communication manager as described with reference to FIGS. 12 through 15.

At 2115, the base station may set a retransmission parameter associated with the first uplink communication based on the latency indication. The operations of 2115 may be performed according to the methods described herein. In some examples, aspects of the operations of 2115 may be performed by a retransmission manager as described with reference to FIGS. 12 through 15.

Figure 22:
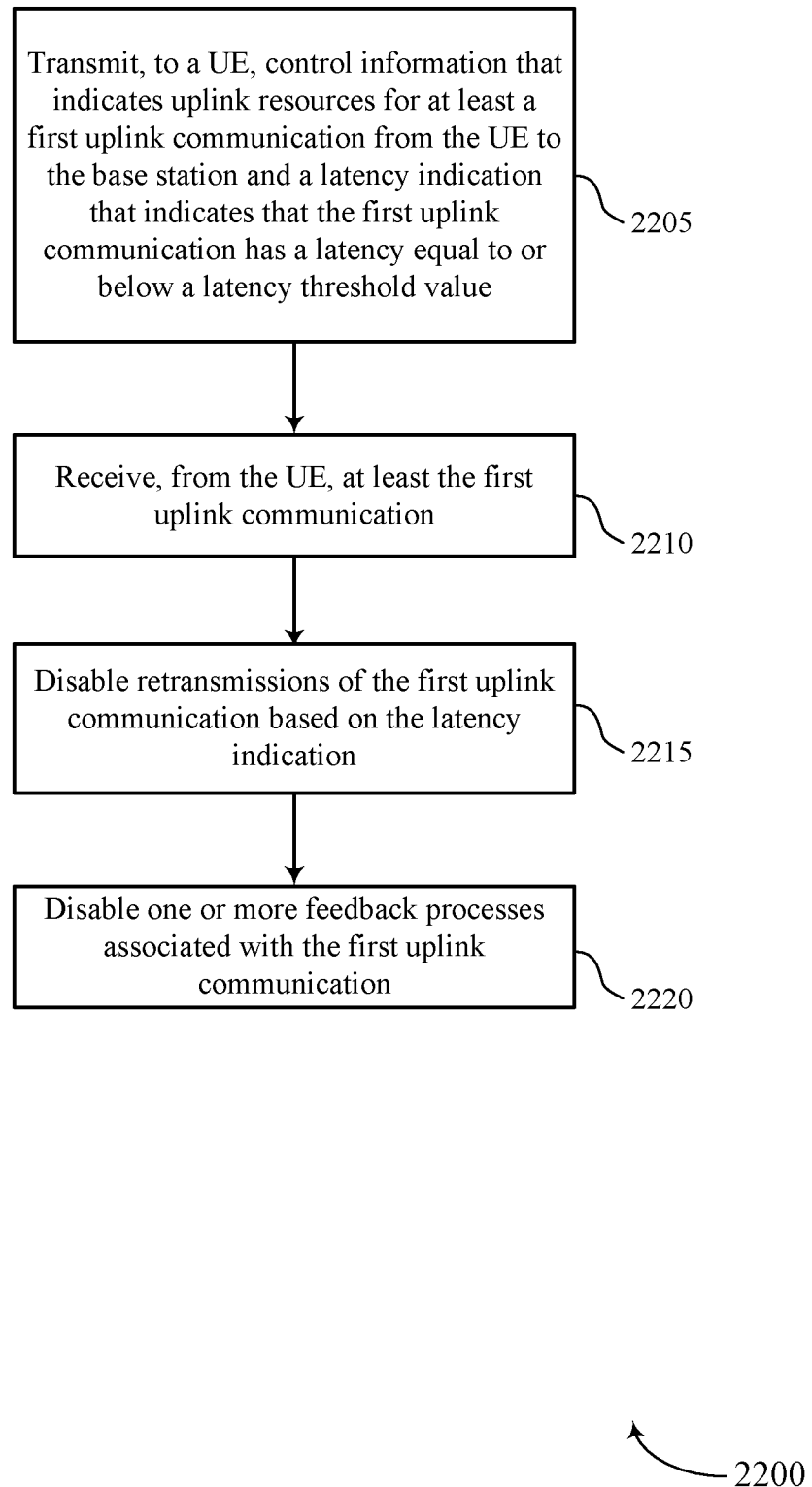

FIG. 22 shows a flowchart illustrating a method 2200 that supports low latency transmission techniques for uplink power saving in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, control information that indicates uplink resources for at least a first uplink communication from the UE to the base station and a latency indication that indicates that the first uplink communication has a latency equal to or below a latency threshold value. The operations of 2205 may be performed according to the methods described herein. In some examples, aspects of the operations of 2205 may be performed by an uplink configuration manager as described with reference to FIGS. 12 through 15.

At 2210, the base station may receive, from the UE, at least the first uplink communication. The operations of 2210 may be performed according to the methods described herein. In some examples, aspects of the operations of 2210 may be performed by an uplink communication manager as described with reference to FIGS. 12 through 15.

At 2215, the base station may disable retransmissions of the first uplink communication based on the latency indication. The operations of 2215 may be performed according to the methods described herein. In some examples, aspects of the operations of 2215 may be performed by a retransmission manager as described with reference to FIGS. 12 through 15.

At 2220, the base station may disable one or more feedback processes associated with the first uplink communication. The operations of 2220 may be performed according to the methods described herein. In some examples, aspects of the operations of 2220 may be performed by a latency mode manager as described with reference to FIGS. 12 through 15.

Figure 23:
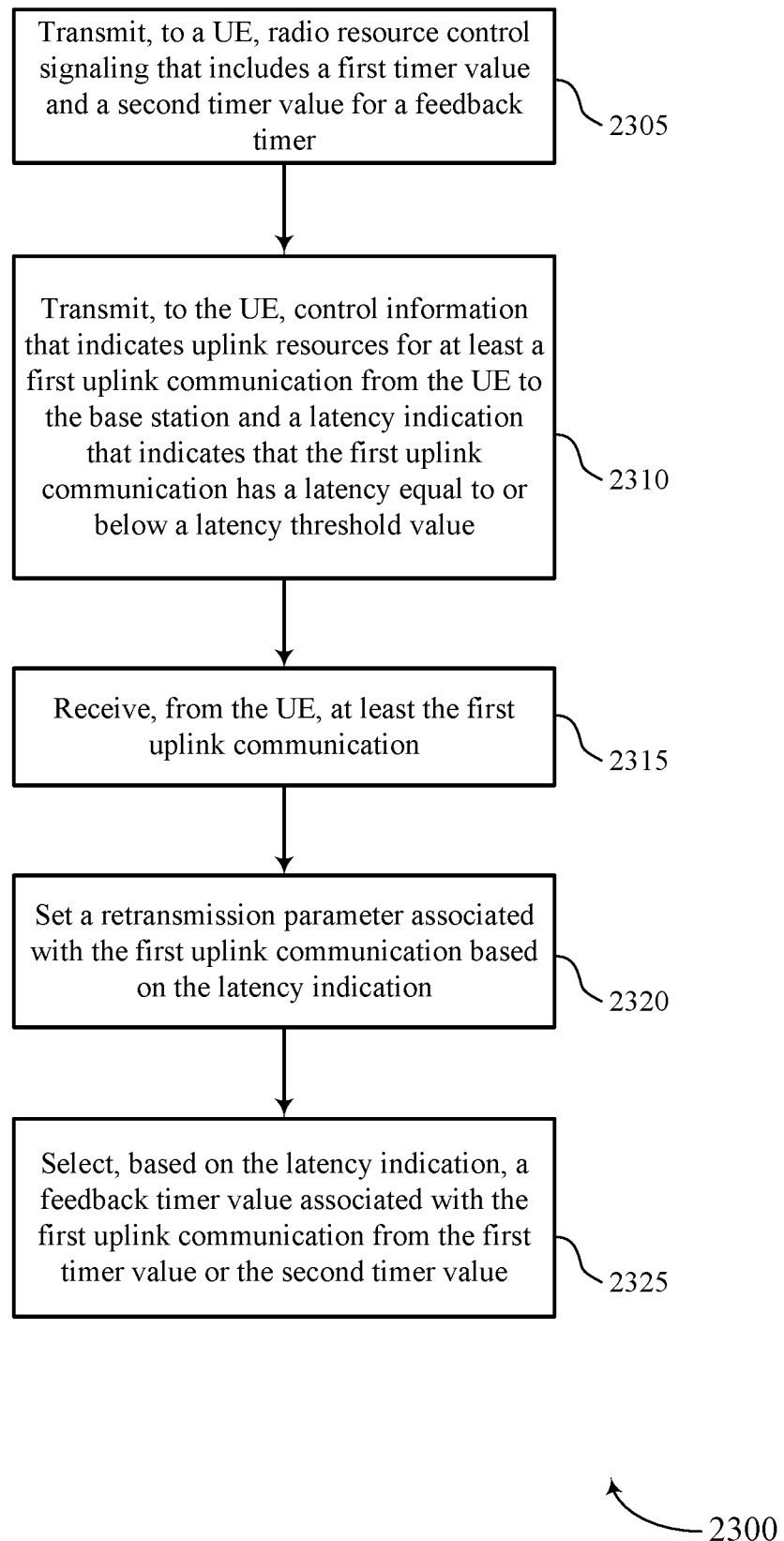

FIG. 23 shows a flowchart illustrating a method 2300 that supports low latency transmission techniques for uplink power saving in accordance with aspects of the present disclosure. The operations of method 2300 may be implemented by a base station 105 or its components as described herein. For example, the operations of method 2300 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2305, the base station may transmit, to a UE, radio resource control signaling that includes a first timer value and a second timer value for a feedback timer. The operations of 2305 may be performed according to the methods described herein. In some examples, aspects of the operations of 2305 may be performed by a retransmission timer manager as described with reference to FIGS. 12 through 15.

At 2310, the base station may transmit, to the UE, control information that indicates uplink resources for at least a first uplink communication from the UE to the base station and a latency indication that indicates that the first uplink communication has a latency equal to or below a latency threshold value. The operations of 2310 may be performed according to the methods described herein. In some examples, aspects of the operations of 2310 may be performed by an uplink configuration manager as described with reference to FIGS. 12 through 15.

At 2315, the base station may receive, from the UE, at least the first uplink communication. The operations of 2315 may be performed according to the methods described herein. In some examples, aspects of the operations of 2315 may be performed by an uplink communication manager as described with reference to FIGS. 12 through 15.

At 2320, the base station may set a retransmission parameter associated with the first uplink communication based on the latency indication. The operations of 2320 may be performed according to the methods described herein. In some examples, aspects of the operations of 2320 may be performed by a retransmission manager as described with reference to FIGS. 12 through 15.

At 2325, the base station may select, based on the latency indication, a feedback timer value associated with the first uplink communication from the first timer value or the second timer value. The operations of 2325 may be performed according to the methods described herein. In some examples, aspects of the operations of 2325 may be performed by a retransmission timer manager as described with reference to FIGS. 12 through 15.

Figure 24:
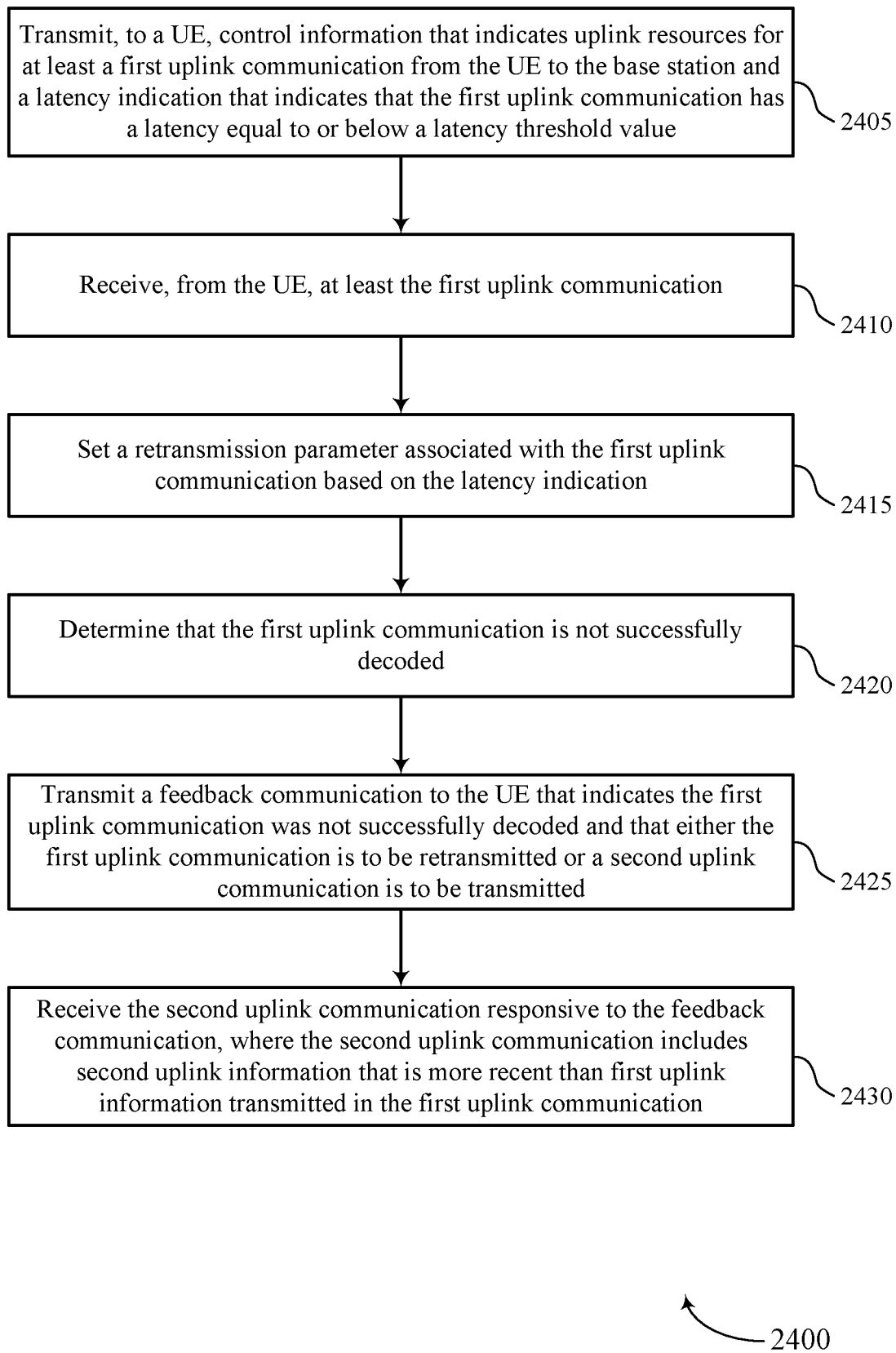

FIG. 24 shows a flowchart illustrating a method 2400 that supports low latency transmission techniques for uplink power saving in accordance with aspects of the present disclosure. The operations of method 2400 may be implemented by a base station 105 or its components as described herein. For example, the operations of method 2400 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2405, the base station may transmit, to a UE, control information that indicates uplink resources for at least a first uplink communication from the UE to the base station and a latency indication that indicates that the first uplink communication has a latency equal to or below a latency threshold value. The operations of 2405 may be performed according to the methods described herein. In some examples, aspects of the operations of 2405 may be performed by an uplink configuration manager as described with reference to FIGS. 12 through 15.

At 2410, the base station may receive, from the UE, at least the first uplink communication. The operations of 2410 may be performed according to the methods described herein. In some examples, aspects of the operations of 2410 may be performed by an uplink communication manager as described with reference to FIGS. 12 through 15.

At 2415, the base station may set a retransmission parameter associated with the first uplink communication based on the latency indication. The operations of 2415 may be performed according to the methods described herein. In some examples, aspects of the operations of 2415 may be performed by a retransmission manager as described with reference to FIGS. 12 through 15.

At 2420, the base station may determine that the first uplink communication is not successfully decoded. The operations of 2420 may be performed according to the methods described herein. In some examples, aspects of the operations of 2420 may be performed by a retransmission manager as described with reference to FIGS. 12 through 15.

At 2425, the base station may transmit a feedback communication to the UE that indicates the first uplink communication was not successfully decoded and that either the first uplink communication is to be retransmitted or a second uplink communication is to be transmitted. The operations of 2425 may be performed according to the methods described herein. In some examples, aspects of the operations of 2425 may be performed by a retransmission manager as described with reference to FIGS. 12 through 15.

At 2430, the base station may receive the second uplink communication responsive to the feedback communication, where the second uplink communication includes second uplink information that is more recent than first uplink information transmitted in the first uplink communication. The operations of 2430 may be performed according to the methods described herein. In some examples, aspects of the operations of 2430 may be performed by an uplink communication manager as described with reference to FIGS. 12 through 15.

The following provides an overview of aspects of the present disclosure:

Aspect 1: A method for wireless communication at a UE, comprising: obtaining, from a base station, control information that indicates uplink resources for at least a first uplink communication from the UE to the base station and a latency indication that indicates that the first uplink communication has a latency equal to or below a latency threshold value; outputting, for transmission to the base station using the uplink resources at least the first uplink communication; and setting a retransmission parameter associated with the first uplink communication based at least in part on the latency indication.

Aspect 2: The method of aspect 1, wherein the latency indication comprises a low latency mode flag that indicates whether the first uplink communication is to use a low latency communication mode that has different retransmission parameters than other communication modes.

Aspect 3: The method of any of aspects 1 through 2, wherein the setting comprises: disabling retransmissions of the first uplink communication based at least in part on the latency indication.

Aspect 4: The method of any of aspects 1 through 3, wherein the setting comprises: disabling one or more feedback retransmission timers associated with the first uplink communication.

Aspect 5: The method of any of aspects 1 through 4, wherein the setting comprises: setting a feedback timer value associated with the first uplink communication based at least in part on the latency indication.

Aspect 6: The method of aspect 5, further comprising: obtaining, from the base station, radio resource control signaling that includes a first timer value and a second timer value, and wherein the feedback timer value is set by selecting one of the first timer value or the second timer value based at least in part on the latency indication.

Aspect 7: The method of aspect 6, wherein the first timer value provides a shorter time for retransmission of a first type of uplink communications than for other types of uplink communications.

Aspect 8: The method of any of aspects 1 through 7, wherein the setting further comprises: setting a feedback timer associated with the first uplink communication based at least in part on the latency indication.

Aspect 9: The method of claim 8 wherein the feedback timer is set to a value that is based at least in part on one or more downlink communications received from the base station.

Aspect 10: The method of any of aspects 8 through 9, wherein the feedback timer is set to a value of a retransmission timer or an inactivity timer associated with one or more feedback processes at the UE and is based on which of the retransmission timer or the inactivity timer has a shorter time duration for the first uplink communication.

Aspect 11: The method of any of aspects 1 through 10, further comprising: obtaining a feedback communication from the base station that indicates the first uplink communication was not successfully decoded and that either the first uplink communication is to be retransmitted or a second uplink communication is to be transmitted; identifying first uplink information included in the first uplink communication is stale; and outputting, for transmission, the second uplink communication based at least in part on the identification, wherein the second uplink communication includes second uplink information that is more recent than the first uplink information.

Aspect 12: The method of aspect 11, wherein the first uplink information and the second uplink information include pose information, and the second uplink information provides more recent pose information than the first uplink information.

Aspect 13: The method of aspect 12, wherein the second uplink information further provides for a reduced motion-to-render-to-photon (M2R2P) delay relative to a M2R2P delay associated with the first uplink information.

Aspect 14: The method of any of aspects 11 through 13, further comprising: selecting one or more transmission parameters of the second uplink communication to provide increased reliability of the second uplink communication.

Aspect 15: The method of any of aspects 1 through 14, wherein the transmitting comprises: transmitting a plurality of repetitions of the first uplink communication; detecting an end-of-burst indication or a feedback inactivity timer expiration associated with the first uplink communication; and discontinuing transmission of the plurality of repetitions based at least in part on the end-of-burst indication or the feedback inactivity timer expiration.

Aspect 16: A method for wireless communication at a UE, comprising: obtaining, from a base station, configuration information that indicates the UE is to skip tracking of uplink transmissions associated with latency communications; outputting, for transmission to the base station, at least a first uplink communication that is associated with the latency communications; and disabling one or more feedback retransmission timers associated with the first uplink communication based at least in part on the configuration information and the first uplink communication being associated with the latency communications.

Aspect 17: The method of aspect 16, further comprising: emptying an uplink buffer associated with the first uplink communication after transmitting the first uplink communication.

Aspect 18: The method of any of aspects 16 through 17, wherein one or more parameters of the first uplink communication are set to increase decoding probability of the first uplink communication relative to other uplink transmissions that are unassociated with the low latency communications.

Aspect 19: The method of aspect 18, wherein the one or more parameters include a modulation and coding scheme parameter, a repetition parameter for transmitting multiple instances of the first uplink communication, a coding rate parameter, a transmit power boosting parameter, or any combinations thereof.

Aspect 20: The method of any of aspects 16 through 19, wherein the obtaining comprises: obtaining, from the base station, RRC signaling, a medium access control (MAC) control element, or combinations thereof, that includes the configuration information and one or more retransmission parameters associated with low latency communications.

Aspect 21: The method of aspect 20, wherein the one or more retransmission parameters include an indication of uplink resources that are for transmission of the low latency communications.

Aspect 22: A method for wireless communication at a base station, comprising: outputting, for transmission to a UE, control information that indicates uplink resources for at least a first uplink communication from the UE to the base station and a latency indication that indicates that the first uplink communication has a latency equal to or below a latency threshold value; obtaining, from the UE, at least the first uplink communication; and setting a retransmission parameter associated with the first uplink communication based at least in part on the latency indication.

Aspect 23: The method of aspect 22, wherein the latency indication comprises a low latency mode flag that indicates whether the first uplink communication is to use a low latency communication mode that has different retransmission parameters than other communication modes.

Aspect 24: The method of any of aspects 22 through 23, wherein the setting comprises: disabling retransmissions of the first uplink communication based at least in part on the latency indication.

Aspect 25: The method of any of aspects 22 through 24, wherein the setting comprises: setting, based at least in part on the latency indication, a feedback timer value associated with the first uplink communication.

Aspect 26: The method of aspect 25, further comprising: transmitting, to the UE, radio resource control signaling that includes the feedback timer value, wherein the feedback timer value is determined by selecting one of a first timer value or a second timer value based at least in part on the latency indication.

Aspect 27: The method of aspect 26, wherein the first timer value provides a shorter time for providing feedback information for a first type of uplink communications than for other types of uplink communications.

Aspect 28: An apparatus for wireless communication at a UE, comprising a at least one processor; memory coupled with the at least one processor; and instructions stored in the memory and executable by the at least one processor to cause the apparatus to perform a method of any of aspects 1 through 15.

Aspect 29: An apparatus for wireless communication at a UE, comprising at least one means for performing a method of any of aspects 1 through 15.

Aspect 30: A non-transitory computer-readable medium storing code for wireless communication at a UE, the code comprising instructions executable by at least one processor to perform a method of any of aspects 1 through 15.

Aspect 31: An apparatus for wireless communication at a UE, comprising at least one processor; memory coupled with the at least one processor; and instructions stored in the memory and executable by the at least one processor to cause the apparatus to perform a method of any of aspects 16 through 21.

Aspect 32: An apparatus for wireless communication at a UE, comprising at least one means for performing a method of any of aspects 16 through 21.

Aspect 33: A non-transitory computer-readable medium storing code for wireless communication at a UE, the code comprising instructions executable by at least one processor to perform a method of any of aspects 16 through 21.

Aspect 34: An apparatus for wireless communication at a base station, comprising at least one processor; memory coupled with the at least one processor; and instructions stored in the memory and executable by the at least one processor to cause the apparatus to perform a method of any of aspects 22 through 27.

Aspect 35: An apparatus for wireless communication at a base station, comprising at least one means for performing a method of any of aspects 22 through 27.

Aspect 36: A non-transitory computer-readable medium storing code for wireless communication at a base station, the code comprising instructions executable by at least one processor to perform a method of any of aspects 22 through 27.

Aspect 37: A user equipment (UE), comprising: a receiver configured to receive, from a base station, control information that indicates uplink resources for at least a first uplink communication from the UE to the base station and a latency indication that indicates that the first uplink communication has a latency equal to or below a latency threshold value; a transmitter configured to transmit at least the first uplink communication to the base station using the uplink resources; a memory comprising code; and at least one processor configured to execute the code to set a retransmission parameter associated with the first uplink communication based at least in part on the latency indication.

Aspect 38: A user equipment (UE), comprising: a receiver configured to receive, from a base station, configuration information that indicates the UE is to skip tracking of uplink transmissions associated with latency communications; a transmitter configured to transmit at least a first uplink communication to the base station that is associated with the latency communications; a memory comprising code; and at least one processor configured to execute the code to disable one or more feedback retransmission timers associated with the first uplink communication based at least in part on the configuration information and the first uplink communication being associated with the latency communications.

Aspect 39: A base station, comprising: a transmitter configured to transmit, to a UE, control information that indicates uplink resources for at least a first uplink communication from the UE to the base station and a latency indication that indicates that the first uplink communication has a latency equal to or below a latency threshold value; a receiver configured to receive, from the UE, at least the first uplink communication; a memory comprising code; and at least one processor configured to execute the code to set a retransmission parameter associated with the first uplink communication based at least in part on the latency indication.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
 a processing system comprising at least one processor and memory coupled with the at least one processor, the processing system configured to:
  obtain control information that indicates uplink resources for at least a first uplink communication from the apparatus to a base station and a latency indication that indicates that the first uplink communication has a latency equal to or below a latency threshold value;
  output, for transmission to the base station using the uplink resources, at least the first uplink communication; and
  set, after outputting at least the first communication, a retransmission parameter associated with the first uplink communication based at least in part on the latency indication.

2. The apparatus of claim 1, wherein the latency indication comprises a low latency mode flag that indicates whether the first uplink communication is to use a low latency communication mode that has different retransmission parameters than other communication modes.

3. The apparatus of claim 1, wherein the processing system is further configured to:
 disable retransmissions of the first uplink communication based at least in part on the latency indication.

4. The apparatus of claim 1, wherein the processing system is further configured to:
 disable one or more feedback retransmission timers associated with the first uplink communication.

5. The apparatus of claim 1, wherein the processing system is further configured to:
 set a feedback timer value associated with the first uplink communication based at least in part on the latency indication.

6. The apparatus of claim 5, wherein the processing system is further configured to:
 obtain radio resource control signaling from the base station that includes a first timer value and a second timer value, and wherein the feedback timer value is set by selecting one of the first timer value or the second timer value based at least in part on the latency indication.

7. The apparatus of claim 6, wherein the first timer value provides a shorter time for retransmission of a first type of uplink communications than for other types of uplink communications.

8. The apparatus of claim 1, wherein the processing system is further configured to:
 set a feedback timer associated with the first uplink communication based at least in part on the latency indication.

9. The apparatus of claim 8 wherein the feedback timer is set to a value that is based at least in part on one or more downlink communications received from the base station.

10. The apparatus of claim 8, wherein the feedback timer is set to a value that corresponds to a value of a retransmission timer or an inactivity timer associated with one or more feedback processes at the apparatus UE and is based on which of the retransmission timer or the inactivity timer has a shorter time duration for the first uplink communication.

11. The apparatus of claim 1, wherein the processing system is further configured to:
 obtain a feedback communication from the base station that indicates the first uplink communication was not successfully decoded and that either the first uplink communication is to be retransmitted or a second uplink communication is to be transmitted;

identify first uplink information included in the first uplink communication is stale; and output, for transmission, the second uplink communication based at least in part on the identification, wherein the second uplink communication includes second uplink information that is more recent than the first uplink information.

12. The apparatus of claim 11, wherein the first uplink information and the second uplink information include pose information, and wherein the second uplink information provides more recent pose information than the first uplink information.

13. The apparatus of claim 12, wherein the second uplink information further provides for a reduced motion-to-render-to-photon (M2R2P) delay relative to a M2R2P delay associated with the first uplink information.

14. The apparatus of claim 11, wherein the processing system is further configured to:

select one or more transmission parameters of the second uplink communication to provide increased reliability of the second uplink communication.

15. The apparatus of claim 1, wherein the processing system is further configured to:

output a plurality of repetitions of the first uplink communication for transmission to the base station;

detect an end-of-burst indication or a feedback inactivity timer expiration associated with the first uplink communication; and discontinue the output of the plurality of repetitions based at least in part on the end-of-burst indication or the feedback inactivity timer expiration.

16. The apparatus of claim 1, further comprising:

a receiver configured to receive the control information and the latency indication that are then obtained by the processing system, wherein the apparatus is configured as a user equipment.

17. An apparatus for wireless communication, comprising:

a processing system comprising at least one processor and memory coupled with the at least one processor, the processing system configured to:

obtain configuration information that indicates the apparatus is to skip tracking of uplink transmissions associated with latency communications;

output, for transmission, at least a first uplink communication that is associated with the latency communications; and disable one or more feedback retransmission timers associated with the first uplink communication based at least in part on the configuration information and the first uplink communication being associated with the latency communications.

18. The apparatus of claim 17, wherein the processing system is further configured to:

empty an uplink buffer associated with the first uplink communication after transmitting the first uplink communication.

19. The apparatus of claim 17, wherein one or more parameters of the first uplink communication are set to increase decoding probability of the first uplink communication relative to other uplink transmissions that are unassociated with the latency communications.

20. The apparatus of claim 19, wherein the one or more parameters include a modulation and coding scheme parameter, a repetition parameter for transmitting multiple instances of the first uplink communication, a coding rate parameter, a transmit power boosting parameter, or any combinations thereof.

21. The apparatus of claim 17, wherein the processing system is further configured to:

obtain radio resource control (RRC) signaling, a medium access control (MAC) control element, or combinations thereof, that includes the configuration information and one or more retransmission parameters associated with latency communications.

22. The apparatus of claim 21, wherein the one or more retransmission parameters include an indication of uplink resources that are for transmission of the latency communications.

23. The apparatus of claim 17, further comprising:

a receiver configured to receive the configuration information that is then obtained by the processing system, wherein the apparatus is configured as a user equipment.

24. An apparatus for wireless communication, comprising:

a processing system comprising at least one processor and memory coupled with the at least one processor, the processing system configured to:

output, for transmission to a user equipment (UE), control information that indicates uplink resources for at least a first uplink communication from the UE to the apparatus and a latency indication that indicates that the first uplink communication has a latency equal to or below a latency threshold value;

obtain, from the UE, at least the first uplink communication; and set a retransmission parameter associated with the first uplink communication based at least in part on the latency indication.

25. The apparatus of claim 24, wherein the latency indication comprises a low latency mode flag that indicates whether the first uplink communication is to use a low latency communication mode that has different retransmission parameters than other communication modes.

26. The apparatus of claim 24, wherein the processing system is further configured to:

disable retransmissions of the first uplink communication based at least in part on the latency indication.

27. The apparatus of claim 24, wherein the processing system is further configured to:

set, based at least in part on the latency indication, a feedback timer value associated with the first uplink communication.

28. The apparatus of claim 27, wherein the processing system is further configured to:

output, for transmission to the UE, radio resource control signaling that includes the feedback timer value, wherein the feedback timer value is determined by selecting one of a first timer value or a second timer value based at least in part on the latency indication.

29. The apparatus of claim 28, wherein the first timer value provides a shorter time for providing feedback information for a first type of uplink communications than for other types of uplink communications.

30. The apparatus of claim 24, further comprising:

a transmitter configured to transmit the control information and the latency indication that is output by the processing system; and a receiver configured to receive the first uplink communication that is then obtained by the processing system, wherein the apparatus is configured as a base station.

\* \* \* \* \*